United States Patent
Wang et al.

(10) Patent No.: US 11,144,121 B2
(45) Date of Patent: Oct. 12, 2021

(54) WEARABLE INTERACTIVE USER INTERFACE

(71) Applicant: Apple Inc., Cupertino, CA (US)

(72) Inventors: Paul X. Wang, Cupertino, CA (US); Zheng Gao, Sunnyvale, CA (US); Reza Nasiri Mahalati, Belmont, CA (US); Ray L. Chang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/863,984

(22) Filed: Apr. 30, 2020

(65) Prior Publication Data

US 2020/0257362 A1 Aug. 13, 2020

Related U.S. Application Data

(63) Continuation of application No. 15/629,619, filed on Jun. 21, 2017, now Pat. No. 10,642,356.

(60) Provisional application No. 62/398,475, filed on Sep. 22, 2016, provisional application No. 62/354,793, filed on Jun. 26, 2016.

(51) Int. Cl.
  *G06F 3/01* (2006.01)
  *G06F 3/0354* (2013.01)
  *G06F 3/0346* (2013.01)

(52) U.S. Cl.
  CPC .............. *G06F 3/014* (2013.01); *G06F 3/016* (2013.01); *G06F 3/0346* (2013.01); *G06F 3/03547* (2013.01)

(58) Field of Classification Search
  CPC .. G06F 1/163; G06F 3/011; G06F 3/014–017; G06F 3/033; G06F 3/0346; G06F 3/03547; G06F 3/038; G06F 3/0383; G06F 3/039; G06F 3/0414; G06F 3/0416; G06F 3/044; G06F 2203/0331; G06F 2203/0335
  See application file for complete search history.

(56) References Cited

U.S. PATENT DOCUMENTS

| | | | |
|---|---|---|---|
| 5,143,505 A | 9/1992 | Burdea et al. | |
| 5,983,727 A | 11/1999 | Wellman et al. | |
| 6,128,004 A | 10/2000 | McDowall et al. | |
| (Continued) | | | |

FOREIGN PATENT DOCUMENTS

CN 204129657 1/2015

OTHER PUBLICATIONS

Smart Fabrics: For Intelligent and Interactive Products, BodiTrack, Vista Medical, PatientTech, Winnipeg, MB Canada, retrieved Online: Mar. 8, 2017 at www.boditrak.com/pdf/Industrial%20BT%20singles%20SCREEN%204-25-2013.pdf.

*Primary Examiner* — Nathan Danielsen
(74) *Attorney, Agent, or Firm* — Kendall W. Abbasi

(57) ABSTRACT

Embodiments are directed to a user input device and methods related to the use thereto. In one aspect, an embodiment includes a flexible fabric attachable to a user having a first portion and a second portion. The first portion may be moveable in relation to the second portion. The embodiment may further include a controller configured to identify an input configuration based on a position of the first portion relative to a position of the second portion within a three-dimensional space. The embodiment may further include a haptic feedback structure disposed adjacent the flexible fabric and configured to provide haptic feedback based on the input configuration.

20 Claims, 26 Drawing Sheets

(56) References Cited

U.S. PATENT DOCUMENTS

| | | |
|---|---|---|
| 6,360,615 B1 | 3/2002 | Smela |
| 6,589,171 B2 | 7/2003 | Keirsbilck |
| 7,191,803 B2 | 3/2007 | Orr et al. |
| 7,595,788 B2 | 9/2009 | Son |
| 7,862,522 B1 | 1/2011 | Barclay et al. |
| 8,031,172 B2 | 10/2011 | Kruse et al. |
| 8,368,641 B2 | 2/2013 | Tremblay et al. |
| 8,704,758 B1 | 4/2014 | Figley et al. |
| 8,665,241 B2 | 5/2014 | Heubel |
| 9,110,505 B2 | 8/2015 | Mastandrea |
| 2005/0037844 A1 | 2/2005 | Shum et al. |
| 2005/0063564 A1 | 5/2005 | Yamamoto et al. |
| 2009/0322680 A1 | 12/2009 | Festa |
| 2010/0214239 A1* | 8/2010 | Wu .................... G06F 3/03547 345/173 |
| 2010/0234182 A1* | 9/2010 | Hoffman ................ G06F 3/014 482/8 |
| 2010/0302015 A1 | 12/2010 | Kipman et al. |
| 2011/0087115 A1 | 4/2011 | Sackner et al. |
| 2012/0226197 A1 | 9/2012 | Sanders et al. |
| 2013/0328770 A1 | 12/2013 | Parham |
| 2014/0135593 A1 | 5/2014 | Jayalth et al. |
| 2015/0091859 A1 | 4/2015 | Rosenberg et al. |
| 2015/0122042 A1 | 5/2015 | Lin et al. |
| 2015/0250420 A1 | 9/2015 | Longinotti-Buitoni et al. |
| 2015/0341606 A1 | 11/2015 | Xu et al. |
| 2015/0366504 A1 | 12/2015 | Connor |
| 2016/0030835 A1 | 2/2016 | Argiro |
| 2016/0054797 A1 | 2/2016 | Tokubo et al. |
| 2016/0070347 A1 | 3/2016 | McMillen et al. |
| 2016/0246369 A1 | 8/2016 | Osman |
| 2016/0313798 A1 | 10/2016 | Connor |
| 2016/0327979 A1 | 11/2016 | Lettow |
| 2016/0363997 A1 | 12/2016 | Black et al. |

* cited by examiner

WEARABLE INTERACTIVE USER INTERFACE

CROSS-REFERENCE TO RELATED APPLICATION(S)

This application is a continuation of U.S. patent application Ser. No. 15/629,619, filed Jun. 21, 2017, which claims the benefit of U.S. provisional patent application No. 62/354,793, filed Jun. 26, 2016 and U.S. provisional patent application No. 62/398,475, filed Sep. 22, 2016, all of which are hereby incorporated by reference herein in their entireties.

FIELD

The described embodiments relate generally to a user input device. More particularly, the present embodiments relate to a wearable user input device with haptic feedback elements incorporated therein to create an immersive computing environment.

BACKGROUND

In computing systems, a user input device may be employed to receive input from a user. Many traditional user input devices, such as keyboards, have a fixed or static layout, which limits the adaptability of the device. Additionally, traditional input devices may be rigid and substantially detached from a user, thereby limiting the functionality of the input device.

SUMMARY

Embodiments of the present invention are directed to a user input device.

In a first aspect, the present disclosure includes a user input device. The user input device includes a flexible fabric configured to attach to a user having a first portion and a second portion. The first portion is moveable in relation to the second portion. The user input device further includes a controller configured to identify an input configuration based on a position of the first portion relative to a position of the second portion within a three-dimensional space. The user input device further includes a haptic feedback structure disposed adjacent the flexible fabric and configured to provide haptic feedback based on the input configuration.

A number of feature refinements and additional features are applicable in the first aspect and contemplated in light of the present disclosure. These feature refinements and additional features may be used individually or in any combination. As such, each of the following features that will be discussed may be, but are not required to be, used with any other feature combination of the first aspect.

For example, in an embodiment, the user input device may further include a primary sensing region forming part of the first portion and a secondary sensing region forming part of the second portion. In this regard, the controller may be configured to receive a first output from the primary sensing region that indicates the position of the first portion. Further, the controller may be configured to receive a second output from the secondary sensing region that indicates the position of the second portion.

In another embodiment, the flexible fabric may define a touch-sensitive surface proximal to the first portion and configured to sense a touch input. In some instances, the controller may be configured to identify movements of the first and second portions as not corresponding to the identified input configuration. Further, at least one of the first portion and the second portion may be configured to exert a suction force on the user to attach the flexible fabric to the user.

In another embodiment, the haptic feedback structure may include a flexible bladder configured to expand in response to an internal force. The expansion of the flexible bladder may conform the flexible fabric to a shape of a user's hand. Additionally or alternatively, the haptic feedback structure may include a textured surface. In some instances, the textured surface may be configured to translate relative to the user, thereby providing the haptic feedback.

According to another embodiment, the flexible fabric may define the shape of a glove. The flexible fabric may include a stiffening element extending between the first and the second portions. The flexible fabric may be configured to stiffen in response to at least one of a magnetic force or a temperature change.

In this regard, a second aspect of the present disclosure includes a user input device. The user input device includes a first attachment piece configured for attachment to a user at a first location. The user input device further includes a second attachment piece configured for attachment to a user at a second location. The user input device further includes a sensor coupled to the first and the second attachment pieces and configured to determine a position of the first attachment piece relative to a position of the second attachment piece. The user input device further includes a controller. The controller may be configured to identify an input configuration based on the position of the first and second attachment pieces. The controller may be further configured to generate a user input signal based on the identified input configuration.

A number of feature refinements and additional features are applicable in the second aspect and contemplated in light of the present disclosure. These feature refinements and additional features may be used individually or in any combination. As such, each of the following features that will be discussed may be, but are not required to be, used with any other feature combination of the second aspect.

For example, in an embodiment, the sensor may include at least one of an accelerometer, a gyrometer, or a capacitive array. Additionally or alternatively, the sensor may include a first gyrometer having a first size and a second gyrometer having a second size that differs from the first size. In some instances, the first attachment piece may be configured to deform in response to a force. In this regard, the user input device may include a mechanical switch configured to produce an electrical response in response to the deformation of the first attachment piece; this may permit touch sensing, for example. In some cases, the mechanical switch may include a strain-sensitive element. The strain-sensitive element may be configured to provide haptic feedback.

According to another embodiment, the first location may be a first finger of the user and the second location may be a second finger of the user.

In another embodiment, the first attachment piece includes a dynamically configurable light source configured to display an output. The output may include a keyboard shape. The input configuration may correspond to the position of the second attachment piece relative to a position of the keyboard shape. In some cases, the first attachment piece may be coupled with a docking station. In this regard, the first attachment piece may be configured to receive an electrical signal from the docking station.

In this regard, a third aspect of the present disclosure includes a method of operating a user input device. The method includes positioning a flexible fabric to define an input configuration. The method further includes determining, through measurement circuitry, a time taken to position the flexible fabric in the input configuration. The method further comprises determining the position of the flexible fabric in the input configuration. The method further includes, based on the time and the position of the flexible fabric in the input configuration, generating an output signal.

A number of feature refinements and additional features are applicable in the third aspect and contemplated in light of the present disclosure. These feature refinements and additional features may be used individually or in any combination. As such, each of the following features that will be discussed may be, but are not required to be, used with any other feature combination of the third aspect.

For example, in an embodiment, the method may further include, based on the time and the position of the flexible fabric in the input configuration, generating haptic feedback through the flexible fabric.

In another embodiment, the input configuration may be a first input configuration. The first input configuration may correspond to a first predetermined function executable by a separate computing device. In this regard, the method may further include positioning the flexible fabric to define a second input configuration. The second input configuration may correspond to a second predetermined function executable by a separate computing device.

According to another embodiment, the method may further include receiving a dynamic feedback signal from the separate computing device. The dynamic feedback signal may be based, in part, on the flexible fabric being in the first input configuration or the second input configuration. The dynamic feedback signal may include a magnetic field generated at the separate computing device. The magnetic field may be used to exert a force on the flexible fabric. For example, the flexible fabric may include one or more magnets that interact with the magnetic field. The method may further include generating haptic feedback based on the dynamic feedback signal. Further, the separate computing device may include a display having an indicium that corresponds to the first input configuration or the second input configuration.

In another embodiment, the method may further include transmitting a user input signal to a virtual reality device. The user input signal may correspond to the time and the position of the flexible fabric in the input configuration. The virtual reality device may be configured to represent the flexible fabric within an immersive three-dimensional environment based on the user input signal.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
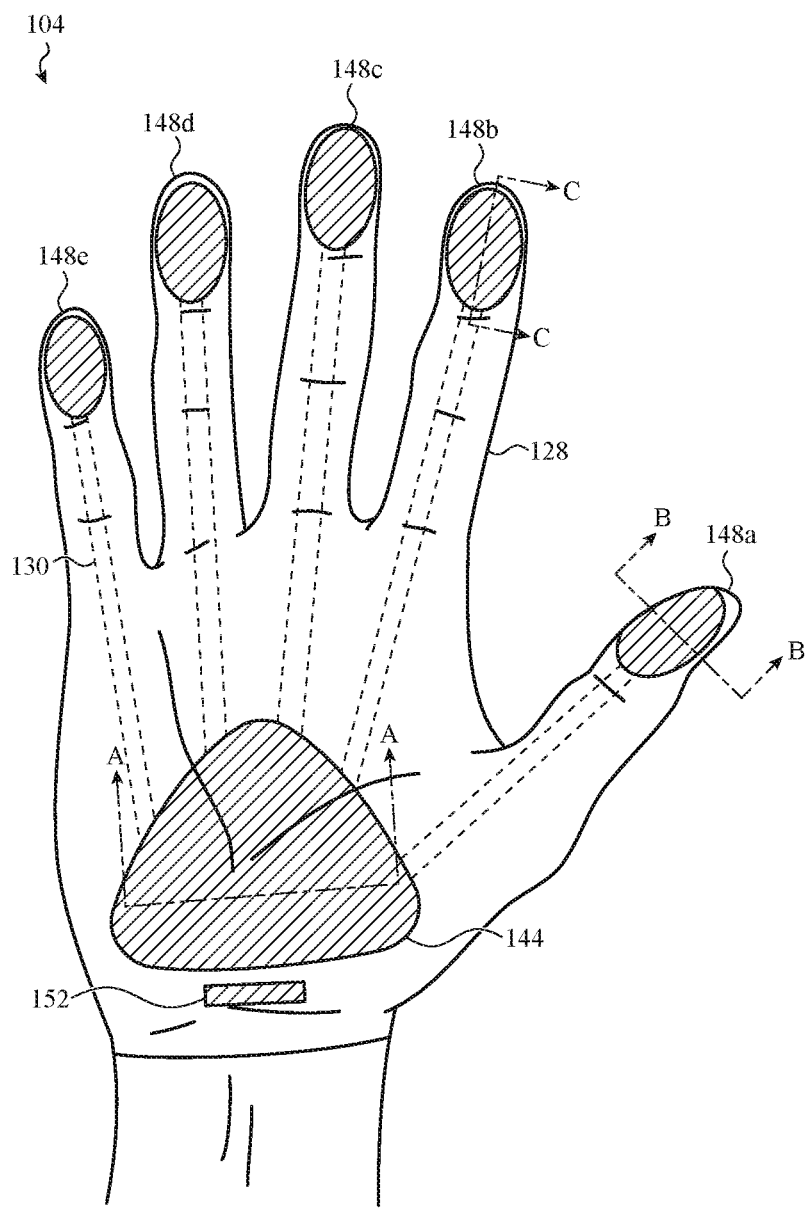
FIG. 1 depicts a user input device, according to one embodiment.

The description that follows includes sample systems, methods, and apparatuses that embody various elements of the present disclosure. However, it should be understood that the described disclosure may be practiced in a variety of forms in addition to those described herein.

The present disclosure describes systems, devices, and techniques related to wearable user input devices, such as a glove, patch, thimble, partial hand covering, glasses, clothing, and/or other wearable items attachable to a user. The user input device includes a flexible fabric and/or conformable material configured to attach to a user at one or more locations. For example, the flexible fabric may include a first portion (or first attachment piece) configured to attach to a user at a first location and a second portion (or second attachment piece) configured to attach to a user at a second location. The first and second portions may expand and contract to conform the flexible fabric to the user. The device facilitates an immersive environment within which a user may interact with a computing device.

The flexible fabric or other material of the user input device may define a wearable item (e.g., such as a glove or separate attachment pieces configured to conform to a user's hand) that includes an array of sensors or measurement circuitry that detect motion of the user input device as it moves through a three-dimensional space. The user input device may be positioned or moved in, or moved through, a variety of input configurations (e.g., including motion patterns, gestures, signs, finger or hand positions, or the like) that are used to provide input to a computing device free of any defined or static user input surface. In one embodiment, a first portion of the flexible fabric may be moved relative to a second portion of the flexible fabric to define an input configuration. The input configuration may correspond to a predetermined function executable by an interconnected computing device. Accordingly, the user input device may be positioned or moved into an input configuration in the air and/or relative to any appropriate or adjacently disposed surface to control a computing device. In this regard, the user input device may be suitable for use with various electronic devices (e.g., a computer, laptop, tablet, smart phone, or the like).

The user input device may be used to control or interact with a virtual environment represented on a virtual reality device. The virtual reality device may include any appropriate device configured to create a visually immersive three-dimensional environment. For example, the virtual reality device may be defined by glasses, goggles, headsets, or the like that are configured to encompass or substantially surround a user's eyes to create a sensory experience that simulates a user's presence in a virtual environment. Additionally or alternatively, a virtual reality device may be a computing device configured to create a holographic projection in real space. In this regard, it will be appreciated that as used herein, the term "computing device" may be any manner of virtual reality device, according to the embodiments described herein. Accordingly, a virtual object represented by, or on, a computing device may be a virtual object represented within the visually immersive three-dimensional environment created by a virtual reality device.

In one embodiment, the user input device may manipulate a virtual environment (e.g., as represented by a virtual reality device) by performing various input configurations. For example, a representation of the user input device may be depicted within the virtual environment (e.g., a virtual representation of the user's hands may be represented within the virtual environment). Further, manipulations of the user input device in real space (e.g., such as that corresponding to a particular input configuration) may also be represented within the virtual environment. In some instances, the manipulation of the user input device may alter the virtual environment. In turn, the user input device may produce various haptic effects (including haptic effects localized to particular portions of the user input device) in response to the altering of the virtual environment. Accordingly, the combination of the user input device and the virtual reality device may create an encompassing sensory experience that allows a user to experience, interact, and/or control a virtual environment in a manner analogous to a user's interactions with a corresponding physical environment.

The user input device may generate a user input signal to control a computing device (including a virtual reality device), for example, by detecting motion of the user input device. This motion may be detected by various techniques, according to the embodiments disclosed herein. For example, motion of the user input device may be determined relative to a "current point." The "current point" may be defined as a static or resting position of the user input device. Additionally or alternatively, motion of the user input device may be detected by reference to a fixed reference point with respect to which the wearable item is calibrated. In one embodiment, the user input device detects motion based on a measured magnitude of an acceleration of the user input device as measured over a period of time. This may allow the user input device to detect various properties, including velocity, traveled distance, and changes in position in order to determine an input configuration.

The user input device (or associated computing device) may identify various gestures, symbols, signs, or the like that correspond to an input configuration. The input configuration may cause the user input device to generate a user input signal for use in controlling a computing device. For example, a user may position or move the user input device into an input configuration for executing a function at an interconnected computing device. As a non-limiting illustration, a "cursor control" input configuration (e.g., identified by a motion pattern of the user input device resembling holding a computer mouse, although no mouse is present) may define an input configuration for use in manipulating a cursor represented by a computing device. The user input device may identify the cursor control input configuration based on a position of a first portion of the flexible fabric relative to a position of the second portion of the flexible fabric. In this regard, upon identifying the cursor control input configuration, the user input device may cause a user input signal to be generated for use in manipulating the represented cursor.

An array of sensors and/or other measurement circuitry may be configured to detect motion of the user input device and/or positions of components thereof (e.g., such as positions of fingers of a glove or positions of a first attachment piece relative to a second attachment piece) that correspond to particular input configurations. For example, the array of sensors may detect motion and/or a position of the user input device. In turn, the user input device (e.g., at an interconnected controller or other processing unit) may associate the detected motion or position with the identified input configuration to control the computing device. By way of continued example, the user input device may detect motion of the user input device between a first position and a second position (associated with the cursor control input configuration). In turn, the user input device may generate a corresponding user input signal to control movement of the represented cursor. For example, the movement of the user input device between the first position and the second position may cause the cursor to move in an analogous manner.

The user input device may simulate a touch or feel of a virtual object represented by a computing device. In this regard, the user input device may provide a tactile sensation indicative of a user interaction with a virtual environment or object by providing dynamic haptic feedback to a user via a haptic feedback structure coupled with the user input device. Various tactile effects may be provided by the haptic feedback structure based on the input configuration, and/or in response to an indication received from one or more sensors, switches, and/or buttons coupled with the wearable item (e.g., in response to a force input received proximal to the wearable item). In one embodiment, the haptic feedback structure may define an interface surface through which haptic feedback is provided to a user. Additionally or alternatively, the haptic feedback structure may be integrated with the flexible fabric, for example, including a structure that changes stiffness to alter a tactile property of the flexible fabric.

The haptic feedback structure may be configured to produce a variety of haptic effects to simulate an immersive environment, including: pressure, temperature, and/or force outputs; simulated friction; distributed weight effects; vibrotactile feedback; and/or other appropriate effects. In some cases, the haptic feedback structure may produce haptic effects in response to a signal from an external device, including in response to a magnetic field produced by the external device. As one example, the external device may include an array of electromagnets that selectively produce a magnetic field. The haptic feedback structure (or other portion of the user input device) may include a magnetic element such that the haptic feedback structure generates a force output when the user input device interacts with (or is positioned near) the external device.

The haptic feedback structure may also produce localized haptic effects. For example, the haptic feedback structure may provide localized haptic feedback to a particular portion of the user input device. To illustrate, when the user input device is defined by a glove, the haptic feedback structure may provide a first haptic effect to a user's thumb and a second haptic effect to a user's index finger. This may allow the user input device to create an immersive environment in which each of a user's fingers experiences a unique sensation based on an input configuration of the user input device and a represented virtual environment.

The combination of the array of sensors and the haptic feedback structure may allow a user to dynamically interact with the computing device via the user input device. For instance, a virtual representation of a three-dimensional object may be represented by, or on, a computing device (e.g., including an interconnected display, holographic projection, virtual reality device, or the like). The user input device may be manipulated into a particular input configuration in order to control or otherwise interact with the three-dimensional object.

Continuing the non-limiting illustration, a user may manipulate the user input device to resemble holding a sculpting tool, although no sculpting tool is present. For example, a user may position a first portion of the flexible fabric relative to a second portion of the flexible fabric to define a "sculpting tool" input configuration (e.g., such that the user input device resembles holding a sculpting tool, although no tool is present). In one embodiment, manipulating the user input device into the sculpting tool configuration may cause a virtual sculpting tool to be represented at a display of a virtual reality device. A user may then manipulate the user input device as he or she would a physical sculpting tool. This manipulation may move or otherwise control the virtual sculpting tool, which may cause the virtual sculpting tool to intersect the three-dimensional object represented by the virtual reality device. For example, a virtual reality device may depict a virtual block of clay with which the virtual sculpting tool may intersect upon manipulation of the user input device. In this regard, by manipulating the user input device in real space, the user input device can affect the three-dimensional object represented by the computing device (e.g., in a virtual space).

Additionally or alternatively, the haptic feedback structure coupled to the user input device may provide haptic feedback based on the interaction of the virtual tool with the represented three-dimensional object. In one embodiment, the haptic feedback structure may provide localized haptic feedback (e.g., selectively providing haptic feedback to a first and/or second portion of the flexible fabric) based on the manipulation of the virtual sculpting tool. Accordingly, the user input device may create an immersive environment in which a user may interact, modify, and/or receive haptic feedback in response to an object and/or environment represented at the computing device.

Other interactions are possible and some examples are described below. For example, the user input device may be manipulated into an input configuration operative to control a virtual keyboard, select or open a file represented by or on a computing device, control an operation of a video game executing on a computing device, and/or any other type of function that may facilitate controlling a computing device.

In some embodiments, the user input device may be coupled with a docking station. The user input device may receive electrical power and/or data communication from the docking station. The docking station may be a wrist band, watch, patch, or other wearable device. The docking station may include a power source, processing unit, and/or other components that support one or more functions of the user input device, according to the embodiments disclosed herein. The docking station may reduce or eliminate the need for a power source or processing unit to be directly attach to (or included within) the user input device. This may allow the user input device to be lightweight, portable, and adaptable. The coupling of the user input device and the docking station may be via wireless or hardwired connection. In some cases, the docking station may define an attachment or securement feature or other type of housing that stores the user input device (or portions thereof) during periods of non-use.

Reference will now be made to the accompanying drawings, which assist in illustrating various features of the present disclosure. The following description is presented for purposes of illustration and description. Furthermore, the description is not intended to limit the inventive aspects to the forms disclosed herein. Consequently, variations and modifications commensurate with the following teachings, and skill and knowledge of the relevant art, are within the scope of the present inventive aspects.

FIG. 1 depicts an example user input device 104, such as the user input device generally described above and described in more detail below. As discussed above, the user input device 104 may include measurement circuitry to determine a position and/or input configuration of the user input device 104. The user input device 104 may also include a haptic feedback structure configured to provide haptic feedback based on the identified input configuration of the user input device 104 and/or in response to an instruction from an associated computing device.

The user input device 104 may include a flexible fabric 128 configured to attach to a user in any appropriate manner. Flexible fabric 128, as shown in FIG. 1, may form a glove or other wearable item that is attachable to a user to create an immersive environment within which a user may interact with a computing device. In some instances, the flexible fabric 128 may form a set of attachment piece that individually attach to a user's fingers.

The flexible fabric 128 may be formed from any appropriate "soft good" material (e.g., leather, textiles, fibers, vinyl, or the like) that exhibits sufficiently compliant and flexible characteristics such that the flexible fabric 128 may conform to a surface of the user (e.g., such as a fabric glove conforms to the shape of a user's hand). In some cases, as described below with respect to FIG. 6A, the flexible fabric 128 may conform to the user via the expansion and contraction of a flexible bladder. Additionally or alternatively, a portion of the flexible fabric 128 may be configured to exert a suction force on the user to attach the flexible fabric 128 to the user.

The flexible fabric 128 may include at least a first portion and a second portion. In some cases, the first portion may be a first attachment piece and the second portion may be a second attachment piece. A first portion of the flexible fabric 128 may be moveable relative to a second portion of the flexible fabric 128 to allow the user input device 104 to be manipulated into various input configurations, according to the embodiments described herein. The flexible fabric 128 may also be sufficiently elastic or resilient such that it does not permanently deform from applied force (e.g., the flexible fabric 128 may substantially return to an original or undeformed shape after the force ceases). The flexible fabric 128 may not be limited to the above exemplary materials, and may also include any other appropriate materials consistent with the various embodiments presented herein, including silicone, plastic, or other flexible materials.

The flexible fabric 128 may be a conductive fabric. For example, the flexible fabric 128 may include one or more electrodes disposed within the flexible fabric 128. The electrodes may be constructed from any appropriate materials, including, for example, a nickel and titanium alloy, such as nitinol. In this regard, a capacitance may be defined between the electrode and, for example, a user to detect a manipulation of the user input device 104. For example, as the user moves and positions the user input device 104, the capacitance measured between the electrode and the user may change. In this regard, the user input device 104 may identify an input configuration by associating the change in capacitance with movements and positions of the user input device 104 that correspond to an input configuration.

The flexible fabric 128 may include conduits 130. The conduits 130 may extend between a first portion of the flexible fabric 128 and a second portion of the flexible fabric 128. The conduits 130 may be configured to modify the stiffness of the flexible fabric 128. In one embodiment, as described in greater detail below with respect to FIG. 6D, the conduits 130 may contain a shape-memory alloy ("SMA") component. The SMA component may deform in a predetermined manner in response to a temperature change. Additionally or alternatively, as described in greater detail below with respect to FIG. 6D, the conduits 130 may include a ferrofluid or other fluid containing a group of magnetically biased particles. The magnetically biased particles respond to an externally applied magnetic field. This may allow the flexible fabric 128 to produce various haptic effects and/or expand and contract to conform the flexible fabric 128 to a user.

The user input device 104 has multiple sensing regions. Each sensing region my include measurement circuitry to detect one or more parameters of the user input device 104. Each of the sensing regions described herein may be disposed on a respective portion of, or attachment piece of, the flexible fabric 128 (e.g., including a first portion or first attachment piece and a second portion or second attachment piece of the flexible fabric 128). In one embodiment, the user input device 104 includes a primary sensing region 144. The primary sensing region 144 may detect global movements of the user input device 104. For example, the primary sensing region 144 may detect the translation of the user input device 104 between a first position and a second position. The primary sensing region 144 may be disposed, for example, at a central region of the user input device 104, such as proximal to a user's palm. The primary sensing region 144 includes measurement circuitry that detects motion of the user input device 104 in real space. For example, the user input device 104 may include one or more accelerometers, gyrometers, magnetometers, optical sensors, or the like to detect motion. As described in greater detail below (e.g., as described at FIGS. 7A-7C), various techniques may be employed to detect motion of the user input device 104, including, motion detection with respect to a fixed reference point, a relative or variable reference point (e.g., such as a previous position of the user input device 104), and/or based on a measured acceleration.

The user input device 104 may also include an array of secondary sensing regions, for example, such as secondary sensing regions 148a, 148b, 148c, 148d, and 148e. The secondary sensing regions 148a-148e may detect a position of the user input device 104 (or portion thereof). For example, in an embodiment where the user input device 104 is a glove, the secondary sensing regions 148a-148e may detect a position of a finger and/or thumb relative to another point of the user input device 104 (e.g., such as a position of the primary sensing region 144, another of the secondary sensing regions 148a-148e, etc.). In this regard, secondary sensing regions 148a-148e may be positioned on the user input device 104 to detect a position of the user input device 104. For example, in the embodiment where the user input device 104 is a glove, each of the secondary sensing regions 148a-148e may be positioned at a finger of the glove. As discussed in greater detail below, the secondary sensing regions 148a-148e may include one or more strain sensors, capacitive sensors, or the like to detect a position of the user input device 104.

In one embodiment, the secondary sensing regions 148a-148e may detect the position of the user input device 104 such that the user input device 104 may identify an input configuration. For example, the secondary sensing regions 148a-148e may detect a position with which the user input device 104 may associate with an input configuration. The disposition of the secondary sensing regions 148a-148e depicted in FIG. 1 represent one example embodiment. In other cases, different arrangements of secondary sensing regions are contemplated, including more or fewer secondary sensing regions. In some embodiments, the secondary sensing regions are disposed over all or a majority of an exterior surface of the user input device 104.

The user input device 104 may also identify an input configuration based on the relative position of any two portions of the flexible fabric 128. A portion of the flexible fabric 128 may be any identifiable subset or region of the flexible fabric 128, for example, such as a region of the flexible fabric 128 proximal to a palm, finger, thumb, and so on, when the user input device 104 is a glove. For example, any two of the primary sensing regions 144 and the secondary sensing regions 148a-148e may be associated with a first portion and a second portion of the flexible fabric 128, respectively. The user input device 104 may be manipulated such that the first and second portions of the flexible fabric 128 are moveable relative to each other. In this manner, the foregoing sensing regions may operate in conjunction to detect movements and/or a position of the first and second portions, according to the embodiments described herein. In turn, the user input device 104 may identify an input configuration based on the detected movement and/or position of the first and second portions.

In some instances, movements of the user input device 104 may not correspond to an input configuration. For example, a user may inadvertently rotate, twist, or otherwise move or position the user input device 104. The user input device 104 may distinguish and differentiate such inadvertent manipulations from an input configuration. To facilitate the foregoing, in one embodiment, the user input device 104 may analyze a sequence of movements or positions of the user input device 104 to identify inadvertent manipulations that are not associated with an input configuration. For example, the user input device 104 may identify a sequence of input configurations corresponding to a user typing on a virtual keyboard. In turn, the user input device 104 may identify a subsequent movement or positioning of the user input device 104 as being an inadvertent manipulation, for example, by comparing the suspected inadvertent manipulation to the analyzed sequence. Such techniques may therefore facilitate noise reduction and improve the accuracy of the user input device 104 in identifying an input configuration.

User input device 104 may also include various other components, such as one or more ports (e.g., charging port, data transfer port, or the like), communications components, additional input/output buttons, and so on. For example, the user input device 104 may include communication module 152, which can be an antenna, a receptacle for a wired connection, and so on. Communication module 152 may be operatively coupled with a processing unit of the user input device 104 and configured to transmit a user input signal. The communication module 152 may wirelessly transmit a user input signal to a computing device. The communication module 152 may also be configured to receive a dynamic feedback signal from a computing device that may be used by the user input device 104 to generate haptic feedback. In this regard the communication module 152 may be used to couple the user input device 104 with a docking station, for example, such as that described below with respect to FIGS. 5A-5C.

Figure 2:
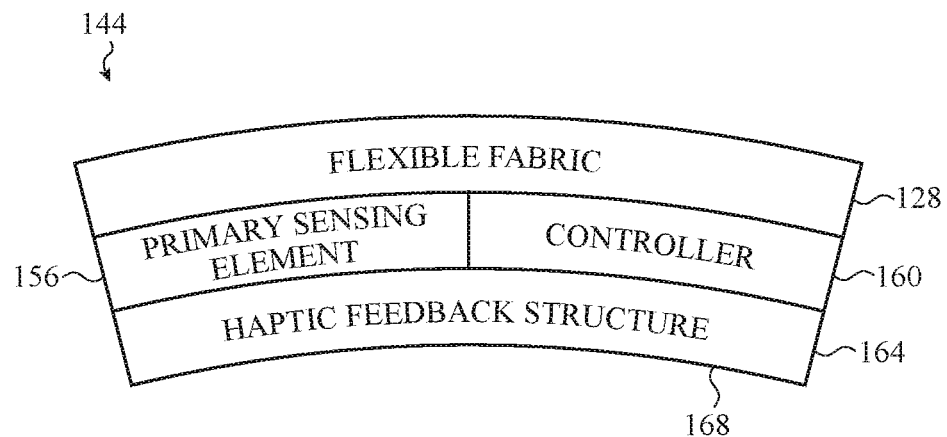
FIG. 2 depicts a simplified cross-sectional view of layers of the embodiment of the user input device of FIG. 1, taken along the line A-A of FIG. 1.

FIG. 2 is a simplified cross-sectional view of layers of one sample implementation of user input device 104 of FIG. 1, taken along line A-A of FIG. 1. In particular, FIG. 2 presents a simplified cross-sectional view of layers of primary sensing region 144. The primary sensing region 144 may be associated with a portion of the flexible fabric 128 (e.g., such as a first or second portion of the flexible fabric 128) that is moveable by a user to define an input configuration. In this regard, as illustrated, the primary sensing region 144 includes a layer of flexible fabric 128 that defines a surface of the user input device 104. Various components may be disposed proximal to, or integrated within, the flexible fabric 128 at the primary sensing region 144 to facilitate the detection of motion of the user input device 104, identify an input configuration, generate an associated user input signal, and/or provide output to a user. For instance, the primary sensing region 144 may include a primary sensing element 156, a controller 160, and/or a haptic feedback structure 164.

The primary sensing element 156 may be or may include any appropriate measurement device or measurement circuitry configured to detect motion of the user input device 104. For example, the primary sensing element 156 may include one or more accelerometers, gyrometers, magnetometers, capacitive sensors, optical sensors, or the like that may generate output data used by the user input device 104 to detect motion of the user input device 104. In one implementation, one or more accelerometers may generate output data corresponding to a magnitude and direction of acceleration of the user input device 104. The output data may be subsequently extrapolated to determine, for example, motion of the user input device 104 relative to, for example, a previous position of the user input device 104. It will be appreciated, however, that the above sensors are provided for purposes of illustration only. Different sensors may be implemented to facilitate detecting motion of the user input device 104, including sensors for use in detecting motion of the user input device 104 relative to a fixed reference point.

The controller 160 (e.g., a processing unit, optionally including executable logic and/or one or more sets of computer readable instructions) may be connected operatively to the primary sensing element 156 to identify an input configuration based on the detected motion or position of the user input device 104. For instance, the controller 160 may receive output data from the primary sensing element 156 in order to determine a position of the user input device 104. In turn, the controller 160 may associate the received motion or position data with an input configuration. The controller 160 may then generate a user input signal based on the identified input configuration. In some embodiments, discussed in greater detail below, the controller 160 may receive a signal associated with a touch and/or force input (received proximal to the flexible fabric 128) that prompts the controller 160 to generate a user input signal. For example, the controller 160 may generate a user input signal based on an indication received from a touch-sensitive surface of the user input device 104.

The haptic feedback structure 164 may provide various types of haptic feedback. The haptic feedback structure 164 may define an interface surface (e.g., such as interface surface 168, depicted in FIG. 2 and FIG. 3) through which haptic feedback may be provided. In some embodiments, the haptic feedback structure 168 may be configured to provide a pressure, temperature, and/or force output (e.g., a user's finger or thumb adjacent to the interface surface 168 may experience a tactile sensation corresponding to an alteration of pressure, temperature, and/or force at the interface surface 168). For example, the haptic feedback structure 164 may include a bladder containing an expandable and compressive fluid. In this regard, the bladder may be configured to expand to generate various haptic effects. In some instances, such as when the user input device is defined by a glove, the expansion of the bladder may allow the user input device 104 to conform to a shape of a user's hand.

In other instances, the haptic feedback structure 164 may simulate frictional and/or distributed weight effects using the interface surface 168. For example and as described in greater detail below, a textured surface of the interface surface 168 (e.g., containing ridges, protrusions, or the like) may be configured to translate relative to, for example, a user's finger to simulate frictional forces acting normal to the user's finger. In this regard, the interface surface 168 may slide or otherwise move along a user's skin. Additionally or alternatively, the interface surface 168 may provide vibrotactile effects, including clicking, popping, or the like, which may be provided via a dome switch or other like mechanism operatively associated with the interface surface 168. It will be appreciated, however, that the above haptic feedback effects are provided for purposes of illustration only. In other contexts, the haptic feedback structure 164 may be configured to provide other varieties of haptic feedback.

Figure 3:
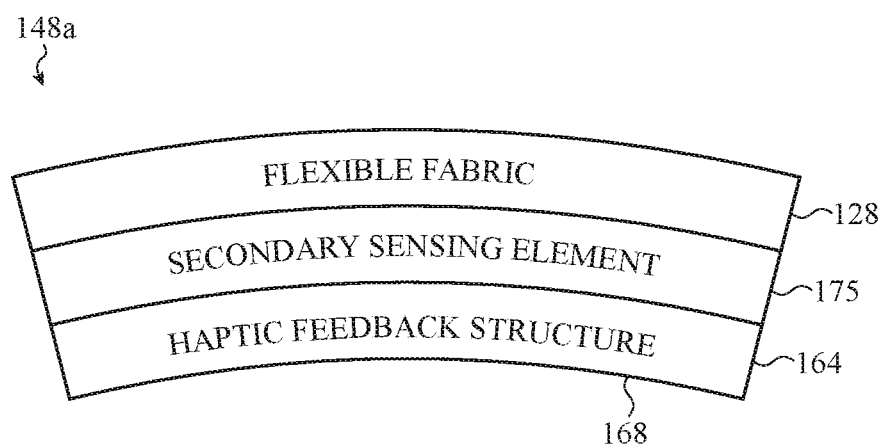
FIG. 3 depicts a simplified cross-sectional view of layers of the embodiment of the user input device of FIG. 1, taken along the line B-B of FIG. 1.

FIG. 3 is a simplified cross-sectional view of the user input device 104 of FIG. 1, taken along line B-B of FIG. 1. In particular, FIG. 3 presents a simplified cross-sectional view of layers of secondary sensing region 148*a*. The secondary sensing region 148*a* may be associated with a portion of the flexible fabric 128 (e.g., such as a first or second portion of the flexible fabric 128) that is moveable by a user to define an input configuration. In this regard, as illustrated, the secondary sensing region 148*a* includes a layer of flexible fabric 128 that defines a surface of the user input device 104. Various components may be disposed proximal to the flexible fabric 128 at the secondary sensing region 148*a* to facilitate detection of the position of the user input device 104 (e.g., the position of secondary sensing region 148*a*), generating haptic feedback, and/or facilitating the initiation of a user input signal based on a touch and/or force input received proximal to the flexible fabric 128. For instance, the secondary sensing region 148*a* may include secondary sensing element 175 and/or haptic feedback structure 164.

In one embodiment, the secondary sensing element 175 may include a strain-sensitive element, for example, such as a piezoelectric sensor, strain gauge, or the like. The strain-sensitive element may detect a force input or deformation of the flexible fabric 128, thereby sensing a location of a touch and/or force, and/or an amount of exerted force. For example, the strain-sensitive element may exhibit a change in an electrical property in response to a mechanical stress (e.g., such as the mechanical stress induced by the adjacent deformation of the flexible fabric 128). In this regard, deformation of the flexible fabric 128 may induce mechanical stress in the strain-sensitive element which in turn produces an electrical output (e.g., a change in a voltage, current, and/or resistance). In one instance, the change in electrical property may be used to initiate generation of a user input signal corresponding to an identified input configuration.

In another embodiment, the secondary sensing element 175 may include a capacitive sensor. The capacitive sensor may detect a touch input and/or force input exerted on the flexible fabric 128. Additionally or alternatively, the capacitive sensor may detect the position of one portion of the flexible fabric 128 in relation to another portion of the flexible fabric 128. For example, the position of secondary sensing region 148*a* may be determined in relation to the position of any of secondary sensing regions 148*b*-148*e* (e.g., as depicted in FIG. 1) by reference to a capacitance value.

Analogous to the primary sensing element 156, the secondary sensing element 175 may also include a gyrometer to detect motion of the user input device 104. In some cases, the gyrometer of the primary sensing element 156 may have a first size and the gyrometer of the secondary sensing element 175 may have a second size that differs from the first size. In this regard, the motion of the user input device 104 may be independently detected at the primary sensing region 144 and the secondary sensing region 148*a* using the gyrometers associated with each region. The independently detected motion measurements may then be compared, combined and/or analyzed to determine a combined motion measurement of the user input device 104. The accuracy and/or precision of the combined motion measurement may be enhanced based at least in part of using the two gyrometers that are different sizes.

By way of example, each of the secondary sensing regions 148*a*-148*e* may measure a capacitance relative to any other of the secondary sensing regions 148*a*-148*e*. In this regard, the user input device 104 may determine a distance between any two of the secondary sensing regions 148*a*-148*e* based on the measured capacitance. In one embodiment, the secondary sensing regions 148*a*-148*e* may each receive various modifiable signals, including frequency, pulse width, or the like (e.g., from controller 160). The modifiable signals may vary between each of the secondary sensing regions 148*a*-148*e* such that the capacitance between the secondary sensing regions 148*a*-148*e* may be a function of the signals.

Accordingly, in one implementation, the capacitance value of each of the secondary sensing regions 148a-148e may be multiplexed for each sensor to distinguish which ones of the secondary sensing regions 148a-148e generate the output at any given time.

The haptic feedback structure 164 may generate haptic feedback analogous to the haptic feedback structure 164 described in FIG. 2. Further, haptic feedback may be provided in response to a touch and/or force input received at secondary sensing element 175. Further, haptic feedback structure 164 may be connected operatively with the controller 160 (e.g., as depicted in FIG. 2) to provide localized haptic feedback. In this regard, the haptic feedback structure 164 may produce a unique or individualized haptic effect at each of (or a combination of) the primary sensing region 144 and/or the secondary sensing regions 148a-148e based on, for example, an identified input configuration. Additionally or alternatively, the haptic feedback structure 164 may include one or more components configured to minimize or dampen the haptic output over regions that are not associated with the localized region, which may mitigate vibratory cross-talk between multiple haptic elements or device components.

FIGS. 4A-4D depict example user input devices 404a, 404b, 404c, and 404d according to various embodiments. The user input devices 404a-404d may be substantially analogous to the user input device 104 described in relation to FIGS. 1-3. For example, the user input devices 404a-404d may include flexible fabrics 428a, 428b, 428c, and 428d, respectively. The user input devices 404a-404d may detect an input configuration for controlling a computing device. Accordingly, the user input devices 404a-404d may include similar software, firmware, and/or hardware components as that of the user input device 104, including a haptic feedback structure, primary sensing regions, secondary sensing regions, strain-sensitive elements, capacitive sensors, and so on.

Notwithstanding the foregoing similarities, the user input devices 404a-404d may include flexible fabrics 428a-428d that define a shape other than a glove. For example, the user input devices 404a-404d may broadly include various combinations of wearable items for use in controlling a computing device. In this regard, the wearable items may be any appropriate structure configured for attachment to a user, including gloves, partial-hand coverings, thimbles, rings, watches, glasses, patches, or any other attachment structure or attachment pieces configured for attachment to a user. Accordingly, any of the embodiments of FIGS. 4A-4D may be flexible and conform to a user.

Figure 4A:
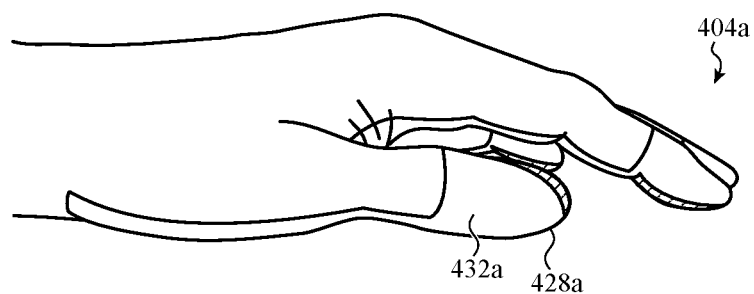
FIG. 4A depicts a user input device, according to one embodiment.

With reference to FIG. 4A, the user input device 404a may define an attachment piece 432a. The attachment piece 432a may substantially surround a user's finger and attach to a bottom portion of a user's hand.

Figure 4B:
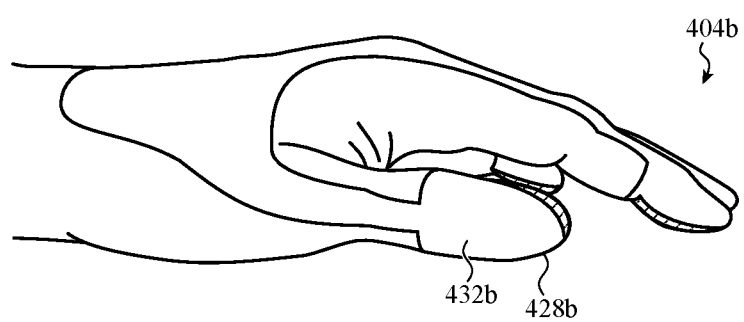
FIG. 4B depicts a user input device, according to another embodiment.

With reference to FIG. 4B, the user input device 404b may define an attachment piece 432b. The attachment piece 432b may substantially surround a user's finger and attach to a top portion of a user's hand.

Figure 4C:
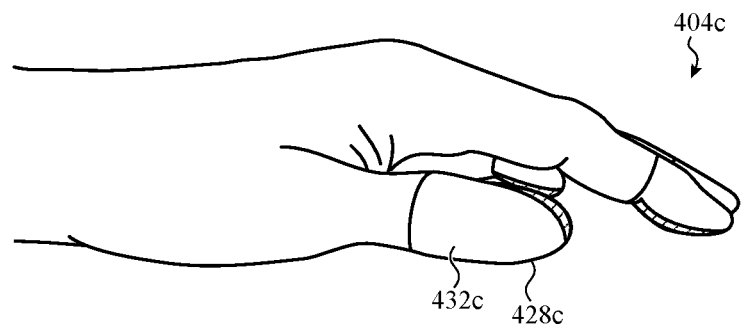
FIG. 4C depicts a user input device, according to another embodiment.

With reference to FIG. 4C, the user input device 404c may define a grouping of attachment pieces 432c. Each attachment piece 432c may individually attach to fingers of a user's hand. For example, each attachment piece 432c may define a thimble or other like structure that substantially surrounds a user's finger.

Figure 4D:
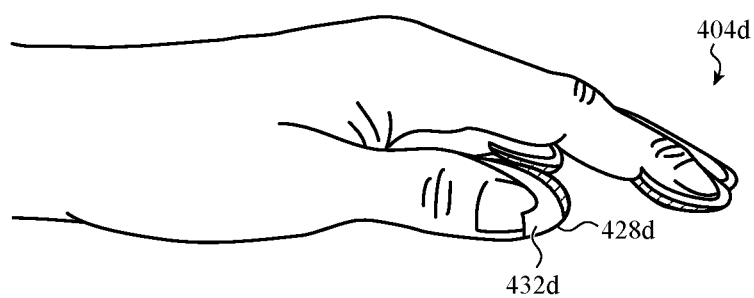
FIG. 4D depicts a user input device, according to another embodiment.

With reference to FIG. 4D, the user input device 404d may define a grouping of attachment pieces 432d. Each attachment piece 432d may individually attach to fingers of a user's hand. For example, each attachment piece of 432d may define a partial finger covering that extends asymmetrically around a user's finger.

Figure 5A:
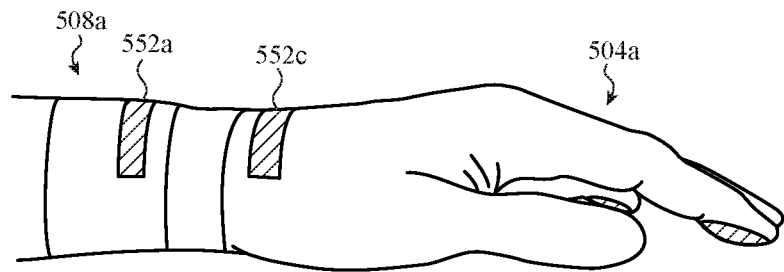
FIG. 5A depicts a user input device and a docking station, according to one embodiment.
Figure 5B:
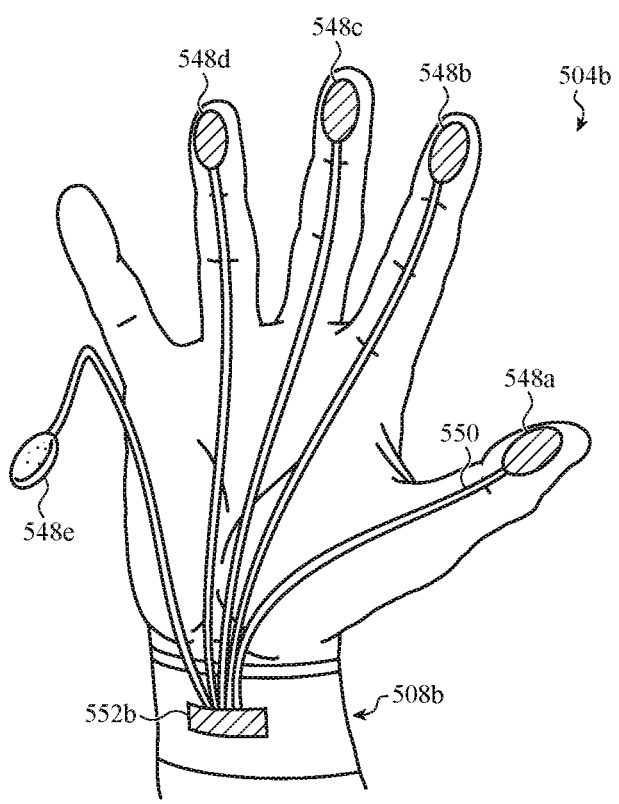
FIG. 5B depicts a user input device and a docking station, according to another embodiment.
Figure 5C:
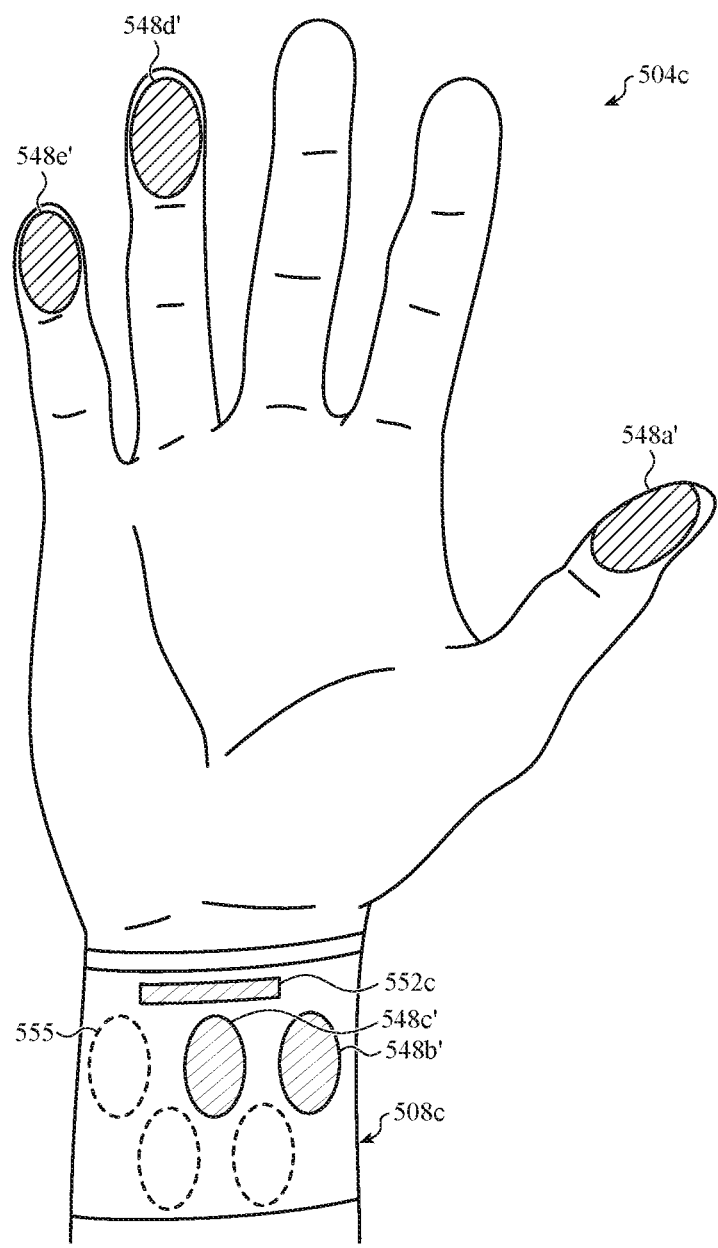
FIG. 5C depicts a user input device and a docking station, according to another embodiment.

FIGS. 5A-5C depict example user input devices 504a, 504b, and 504c, according to various embodiments. The user input devices 504a-504c may be substantially analogous to the user input device 104 with respect to FIGS. 1-3. For example, the user input devices 504a-504c may detect an input configuration for controlling a computing device. Accordingly, the user input devices 504a-504c may include similar software, firmware, and/or hardware components as that of the user input device 104, including haptic feedback structure, primary sensing regions, secondary sensing regions, strain-sensitive elements, capacitive sensors, and so on.

Notwithstanding the foregoing similarities, the user input devices 504a-504c may be configured to couple with a docking station. For example, the user input devices 504a-504c may be configured to couple with any appropriate system that supports one or more functions of the user input devices 504a-504c, including systems that provide electrical power and data communication to the user input devices 504a-504c. In this regard, the user input devices 504a-504c may include various communication modules, antennas, and/or other appropriate features to receive electrical power and data communication from the docking stations 508a-508c. This may allow the user input devices 504a-504c to operate free of a power source or processing unit directly attached, or integrated within, the user input devices 504a-504c. The docking station may include a wrist band, watch, patch, or other electronic device. In some cases, the docking station may be configured to engage or store a respective one of the user input devices 504a-504c (or portions thereof) during period of non-use. This may enhance the adaptability and portability of the user input devices 504a-504c.

With reference to FIG. 5A, the user input device 504a may be coupled with a docking station 504a. As shown in FIG. 5A, the docking station 508a may be a wrist band that may include various components to support the functions of the user input device 504a. The user input device 504a and the docking station 508a may be wirelessly coupled via communication modules 552a. Communication modules 552a may be substantially analogous to the communication module 152 described with respect to FIG. 1. For example, the docking station 508a may wirelessly transmit and receive electrical power and data communication with the user input device 504a via the communication module 552a. In this regard, the docking station 508a may include a power source, processing unit, and/or any other appropriate components (not shown in FIG. 5A) to support the user input device 504a.

With reference to FIG. 5B, the user input device 504b may be coupled with a docking station 508b. As shown in FIG. 5B, the docking station 508b may be a wrist band that may include various components to support functions of the user input device 504b. The user input device 504b may be coupled to the docking station 508b via a hardwired connection. For example, the user input device 504b and the docking station 508b may be connected at communication module 552b.

In some cases, such as that shown in FIG. 5A, the user input device may be defined by a glove. In other cases, such as that shown in FIG. 5B, the user input device 104 may be defined by a set of attachment pieces that attach directly to a user. For example, FIG. 5B depicts a set of secondary sensing regions 548a-548e that are configured to attach directly to a user. The secondary sensing regions 548a-548e may include an adhesive surface, a surface configured to exert a suction force, and/or any other appropriate structure configured to directly attach the secondary sensing regions 548a-548b to the user. As such, the set of secondary sensing regions 548a-548e may define at least a first attachment piece and a second attachment piece that directly attach or conform to a user. As shown in FIG. 5B, the set of secondary sensing regions 548a-548e may be selectively removable from the user during periods of non-use.

The secondary sensing regions 548a-548e may include sensors or measurement circuitry similar to that described with respect to FIGS. 1-3. The secondary sensing regions 548a-548e may be attached to the docking station 508b via wires 550. The wires 550 may extend between each of the set of secondary sensing regions 548a-548e and the docking station 508b. For example, the wires 550 may be attached to the docking station 508b at communication module 552b. The wires 550 may be flexible and/or expandable such that a user may manipulate the user input device 504b into various input configurations free of interference or hindrance from the wires 550. In some instances, the wires 550 may be removeably attached to the docking station 508b at the communication module 552b. This may allow the user input device 504b to be interchanged with various different docking stations.

In the embodiment of FIG. 5B, the set of secondary sensing regions 548a-548e may receive electrical power from the docking station 508b. The docking station 508b may also include a processing unit (not shown in FIG. 5B) that uses the secondary sensing regions 548a-548e to detect an input configuration for controlling a computing device.

With reference to FIG. 5C, the user input device 504c may be coupled with a docking station 508c. As shown in FIG. 5C, the docking station 508b may be a wrist band that may include various components to support functions of the user input device 504b. The user input device 504c may be substantially analogous to the user input device 504b described above with respect to FIG. 5B. For example, the user input device 504c may include a set of secondary sensing regions 548a'-548e' that are configured to directly attach to a user. As such, the set of secondary sensing regions 548a'-548e' may define at least a first attachment piece and a second attachment piece that directly attach to the user.

Notwithstanding the foregoing similarities, the set of secondary sensing regions 548a'-548e' may be wirelessly coupled with the docking station 508c. The docking station 508c may include a communication module 552c that is configured to transfer electrical power and/or data communication to and/or from each of the set of secondary sensing regions 548a'-548e'.

As shown in FIG. 5C, the docking station 508c may include mounts 555. The mounts 555 may be configured to temporality engage the set of secondary sensing regions 548a'-548e' during periods of non-use. The mounts 555 may define a surface of the docking station 508c at which the set of secondary sensing regions 548a'-548e' may be removeably attached. As one non-limiting example, the mounts 555 may define an adhesive surface of the docking station 508c. Additionally or alternatively, the mounts 555 may define a magnetic surface of the docking station 508c. In other embodiments, the mounts 550 may be defined by other securement features, including latches, clips, fasteners, or the like. The secondary sensing regions 548a'-548e may be selectively attached to the mounts 555 such that a subset of the secondary sensing regions 548a'-548e' may be attached to the user. As such, as depicted in FIG. 5C, a subset of the secondary sensing regions 548a-548e may be used to detect an input configuration of controlling a computing device.

FIGS. 6A-6D depict cross-sectional views of the user input device 104 of FIG. 1, taken along line C-C of FIG. 1. In particular, FIGS. 6A-6D present cross-sectional views of alternate embodiments of haptic feedback structure 164 at secondary sensing region 148b.

Figure 6A:
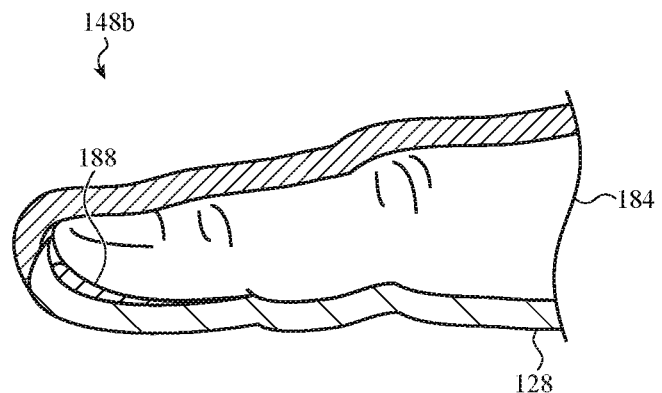
FIG. 6A depicts a simplified cross-sectional view of the user input device of FIG. 1, taken along the line C-C of FIG. 1, according to one embodiment.

As illustrated in the embodiment of FIG. 6A, haptic feedback structure 168 may include a flexible bladder 188. The flexible bladder 188 may be disposed adjacent to a user's finger 184. The flexible bladder 188 may be associated with a portion of the flexible fabric 128 (e.g., such as a first or second portion of the flexible fabric 128) that is moveable by a user to define an input configuration. In this manner, the user input device 104 may generate haptic feedback at the flexible bladder 188 as the user input device 104 is manipulated into various input configurations.

In one implementation, the flexible bladder 188 may be filled with a heat transfer fluid and/or other expandable material (including solids and gases) to produce various haptic effects. For example, the temperature of the fluid may be altered (e.g., by operation of an interconnected heating element) to simulate a hot and/or cold sensation at the interface surface 168. As another example, pressure within the flexible bladder 188 may be altered (e.g., by operation of a thermally expandable element, an interconnected pump, and/or other pressurized chamber, or the like) to simulate a fluctuating pressure. In some embodiments, the temperature and/or pressure of the flexible bladder 188 may be altered to produce or remove moisture within the secondary sensing region 148b.

The flexible bladder 188 may also be used to conform the user input device 104 to a user. As described above, the flexible bladder 188 may expand and contract within the user input device 104. The expansion and contraction of the flexible bladder 188 within the user input device 104 may expand or contract the volume of the user input device 104 (e.g., an internal volume of the secondary sensing region 148b) within which finger 184 is positioned. This may allow the user input device 104 to conform to various different sizes and shapes of fingers. Further, by expanding the flexible bladder 188 such that the user input device 104 conforms to the particular size and shape of a user's finger, the user may experience more precise or realistic haptic effects.

To illustrate, finger 184 may be positioned within the secondary sensing region 148b when the flexible bladder 188 is in a collapsed or contracted state. Once positioned with the secondary sensing region 148b, the flexible bladder 188 may expand. In one implementation, as described above, a force within the flexible bladder 188 may cause the flexible bladder 188 to increase in size, and thereby expand into an internal volume of the secondary sensing region 148b and press into finger 184. The expansion of the flexible bladder 188 may ensure a snug and conforming fit between finger 184 and the user input device 104 at the secondary sensing element 148b.

The snug and conforming fit between finger 184 and the user input device 104 at the secondary sensing region 148b may enhance the haptic effects produced by the haptic feedback structure 168. As one example, a user may experience enhanced tactile sensations via the haptic feedback structure 168 due to a larger area of the user's finger being in direct contact with the haptic feedback structure 168. In some instances, this may help create an immersive environment. For example, the conforming fit may deemphasize the sensation that the user is wearing a glove, and emphasize the haptic effects corresponding to a virtual environment.

Figure 6B:
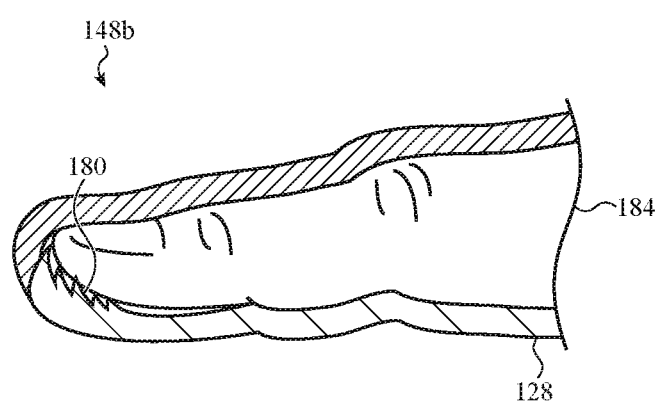
FIG. 6B depicts a simplified cross-sectional view of the user input device of FIG. 1, taken along the line C-C of FIG. 1, according to another embodiment.

As illustrated in the embodiment of FIG. 6B, the haptic feedback structure 168 may include a textured surface 180. The textured surface 180 may be disposed adjacent to a user's finger 184. The textured surface 180 may include various ridges, protrusions, or the like that are configured to contact finger 184. The textured surface 180 may be associated with a portion of the flexible fabric 128 (e.g., such as a first or second portion of the flexible fabric 128) that is moveable by a user to define an input configuration. In this manner, the user input device 104 may generate haptic feedback at the textured surface 180 as the user input device 104 is manipulated into various input configurations.

In one implementation, the textured surface 180 may be configured to produce various haptic effects, including vibrotactile effects. In other implementations, the textured surface 180 may be configured to produce frictional and weight effects. For example, upon actuation, the textured surface 180 may translate relative to the user's finger 184 to simulate a frictional force. One or more actuators, switches, biasing members, or the like may be coupled with the textured surface 180 to translate the textured surface 180 between various positions along an axis proximal to, for example, a user's finger. In this regard, the textured surface 180 may slide across a surface of a user's finger between two or more positions. The protrusions, ridges, or the like that contact the user's finger may slide along with the textured surface 180, for example, to create a haptic effect (e.g., a user may feel the movement of the protrusions, ridges, or the like as they are moved across a user's skin). The textured surface 180 may be calibrated to translate at a predefined rate to produce a desired haptic effect.

In one embodiment, the textured surface 180 may be configured to simulate the sensation of holding an object having a certain mass. For example, the magnitude and direction of the frictional forces produced by the translation of the textured surface 180 relative to the user's finger 184 may produce a haptic effect simulating an object having a certain mass.

Figure 6C:
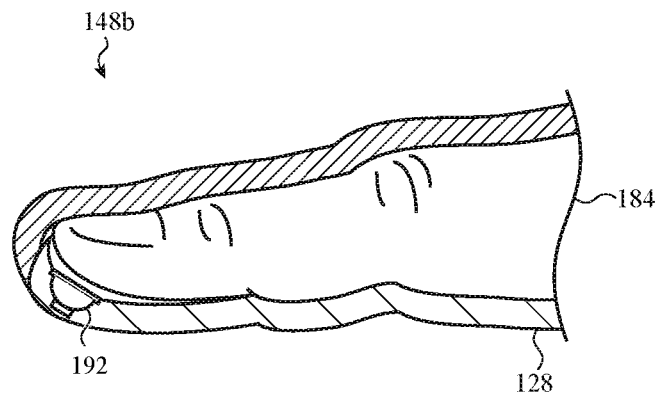
FIG. 6C depicts a simplified cross-sectional view of the user input device of FIG. 1, taken along the line C-C of FIG. 1, according to another embodiment.

As illustrated in the embodiment of FIG. 6C, the haptic feedback structure 168 may also include mechanical switch 192. The mechanical switch 192 may be positioned on, or integrated within, the flexible fabric 128, such that a portion of the mechanical switch 192 is contactable by the user when finger 184 is positioned within the secondary sensing region 148b. This may allow the mechanical switch 192 may be configured to receive a force and/or touch input from finger 184.

The force and/or the touch input may be used by the user input device 104 to identify an input configuration, produce a haptic effect, and/or execute other appropriate functions associated therewith. As described above, a user may position the user input device 104 into a variety of input configurations to control a computing device. In one embodiment, once positioned into a desired input configuration, a user may produce a touch and/or force input at the mechanical switch 192. The touch and/or force input may, in turn, cause the user input device 104 to produce a signal associated with the desired input configuration. As an example, a user may position the user input device 104 into the shape of a hand that is holding a mouse to define a "cursor control" input configuration. Once in the "cursor control" input configuration, a user may exert a touch and/or force input at the mechanical switch 192. This may cause the user input device 104 to produce a signal indicative of the cursor control input configuration.

Additionally or alternatively, the mechanical switch 192 may be used to produce various haptic effects. For example, the mechanical switch 192 may be used in conjunction with various actuators, solenoids, piezoelectric switches, or the like to produce a tactile effect in response to a touch and/or force input received at the mechanical switch 192. As one illustration, a user may exert a touch and/or force input on the mechanical switch 192 when the user input device 104 is positioned relative to a virtual environment represented on a computing device. In response to the touch and/or force input, the haptic feedback structure 168 may generate a tactile sensation corresponding to the virtual environment. In this regard, the mechanical switch 192 may be used to create an interactive immersive environment.

In one embodiment, the mechanical switch 192 may include a dome switch assembly. For example, the mechanical switch 192 may include a collapsible dome configured to buckle in response to a predefined buckling force. The collapsible dome may be resilient and flexible, and may be a thin metal dome, a plastic dome, or may be constructed from other appropriate materials. The collapsible dome may contact a sensing element disposed below the collapsible dome to complete a circuit. This may cause the mechanical switch 192 to produce an electrical response that may be used by the user input device 104 to produce the various functions described herein.

Figure 6D:
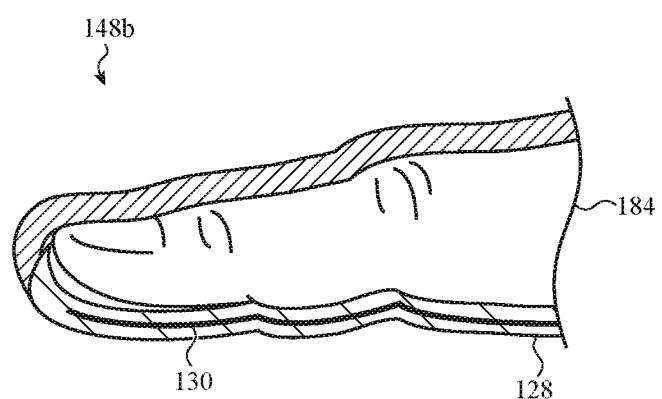
FIG. 6D depicts a simplified cross-sectional view of the user input device of FIG. 1, taken along the line C-C of FIG. 1, according to another embodiment.

As illustrated in the embodiment of FIG. 6D, the flexible fabric 128 may include conduit 130, such as that described above with respect to FIG. 1. The conduit 130 may be used to produce various haptic effects. As described above, the conduit 130 may contain components that are configured to dynamically change shape and/or stiffness. The conduit 130 may therefore cause the flexible fabric 128 to correspondingly change shape and/or stiffness. Such changes in the flexible fabric 128 may be configured to coincide with an input configuration and/or an interaction of the user input device 104 with a virtual environment. In this regard, the conduits may produce haptic effects relating to the virtual environment.

In one embodiment, the conduit 130 may include a ferrofluid. The ferrofluid may contain a suspension of particles that is magnetically biased or that responds to a magnetic field. For example, the suspension of particles may have a particular magnetic polarity such that the conduit is repelled, or attracted to, another object that exerts a particular or specified magnetic field. As described below in greater detail with respect to FIGS. 20A and 20B, the magnetic field may be generated by an external device. This may allow the user input device 104 to experience relatively strong forces when positioned near the external device. The production of the magnetic field by the external device may coincide with the positioning of the user input device 104 into an input configuration. In this regard, a user may experience haptic feedback corresponding to a user's interaction with a virtual environment based on the ferrofluid interacting with the magnetic field produced by the external device.

In another embodiment, the conduit 130 may include an SMA component that deforms in a predetermined manner in response to a temperature change. As one example, the SMA component may be configured to return to an original shape when deformed in response to heat. As such, applying heat to the SMA component may cause the flexible fabric 128 to exert a force on the user as the SMA component attempts to return to an original shape. The heating of the SMA component may coincide with the positioning of the user input device 104 into an input configuration. In this regard, a user may experience haptic feedback corresponding to a user's interaction with a virtual environment based on the force produced in response to heating the SMA component.

It will be appreciated that the haptic feedback structures and interface surfaces described with respect to FIGS. 6A-6D are described for purposes of illustration only. Other haptic feedback structures and interface surfaces are contemplated using other appropriate mechanisms to facilitate providing haptic feedback and/or conforming a portion of the user input device to a user. This may include, without limitation, a dome switch assembly, solenoid, or other appropriate mechanism.

Figure 7A:
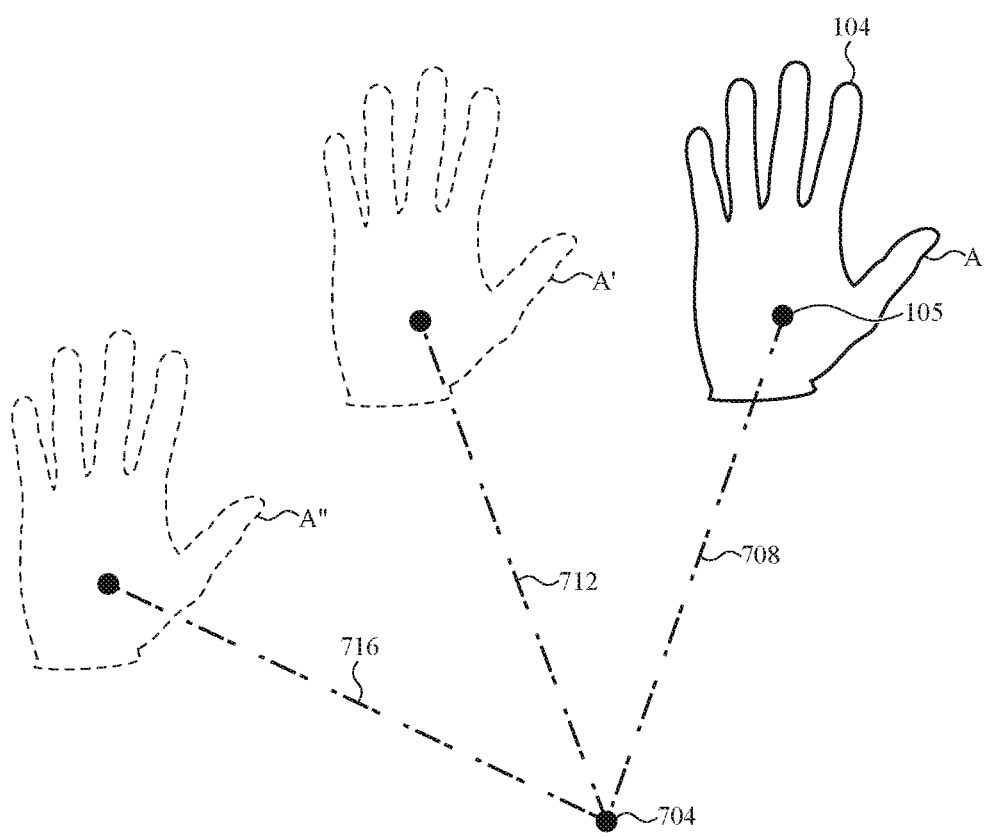
FIG. 7A depicts a schematic view of a user input device that is configured to detect motion of the user input device, according to one embodiment.
Figure 7B:
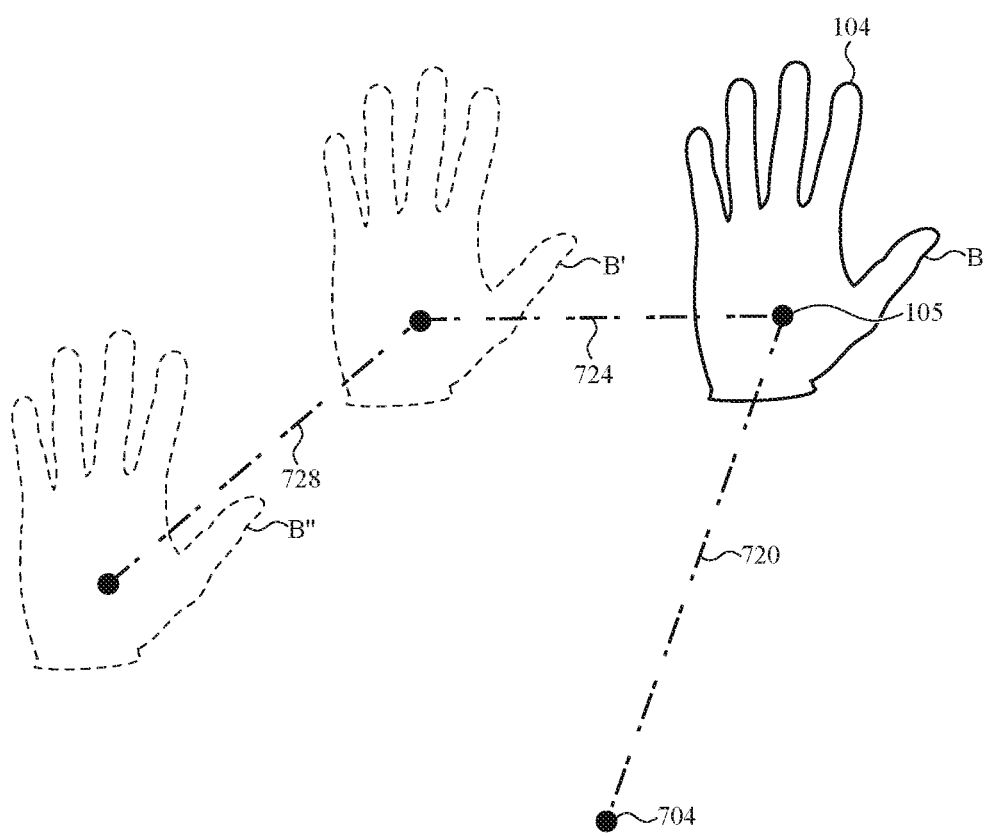
FIG. 7B depicts a schematic view of a user input device that is configured to detect motion of the user input device, according to another embodiment.
Figure 7C:
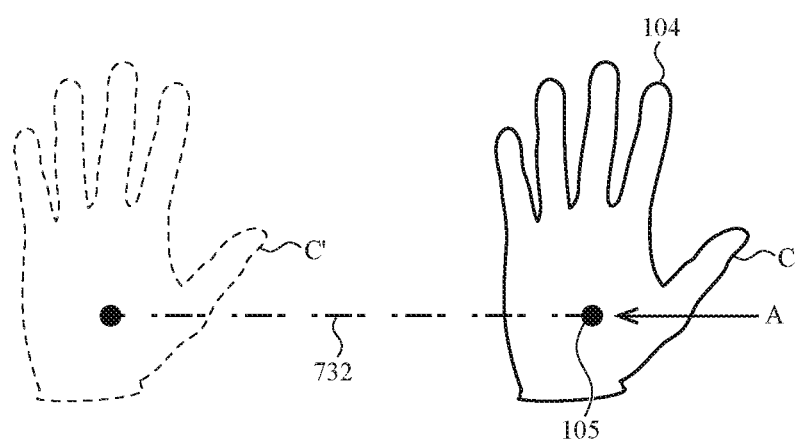
FIG. 7C depicts a schematic view of a user input device that is configured to detect motion of the user input device, according to another embodiment.

FIGS. 7A-7C depict schematic views of the user input device 104, including various techniques for detecting motion of the user input device 104. For example, FIG. 7A depicts a configuration in which motion of the user input device 104 is determined in relation to a fixed reference point, such as reference point 704. The motion of the user input device 104 may be determined by measurement circuitry configured to measure the distance between one or more locations of the user input device 104 (e.g., such as current point 105). The current point 105 may be defined as the current position of the user input device 104 at any given point in time. In some instances, the primary sensing region 144 may be defined as the current point 105 of the user input device 104. The current point 105 may be associated with a portion of the user input device 104 that is moveable by a user to define an input configuration.

For example, when the user input device 104 is in position A, motion of the user input device 104 may be detected by reference to a distance 708 between the current point 105 and the reference point 704. Likewise, when the user input device 104 is moved into position A', its motion may be detected by reference to a distance 712 between the current point 105 and the reference point 704. Similarly, when the user input device 104 is moved into position A", its motion may be detected by reference to a distance 716 between the current point 105 and the reference point 704. In this regard, the distance between the current point 105 and the reference point 704 may be dynamically measured to facilitate the near real time detection of the motion of the user input device 104 as it moves through space.

FIG. 7B depicts a configuration in which motion of the user input device 104 is determined in relation to a previous position of the user input device 104. Initially, when the user input device 104 is in position B, its motion may be detected by reference to a distance 720 between the current point 105 and the fixed reference point 704. When the user input device 104 is moved into position B', its motion may be detected by reference to a distance 724 between the current point 105 at position B and the current point 105 at position B'. Likewise, when the user input device 104 is moved into position B", its motion may be detected by reference to a distance 728 between the current point 105 at position B' and the current point 105 at position B".

FIG. 7C depicts a configuration in which motion of the user input device 104 is determined in relation to a measured acceleration A. In this regard, rather than detect motion of the user input device 104 in relation to a reference point, a measurement device coupled with the user input device 104 may measure an acceleration vector of the user input device 104 as it travels through space. For example, a gyrometer, accelerometer, gyrometer, or the like may output a signal based on a magnitude and/or direction of acceleration of current point 105 over an identified period of time. To illustrate, as depicted in FIG. 7C, acceleration vector A may be measured as the user input device 104 travels between position C and C'. In some cases, the measured acceleration vector A may be interpreted by the user input device 104 to identify a distance 732 corresponding to a distance of travel of the user input device 104 between positions C and C' in the identified period of time.

It will be appreciated that the motion sensing techniques described in relation to FIGS. 7A-7C need not be employed in isolation. Rather, one or more of the above techniques, or additional techniques, may be simultaneously employed to determine a position of the user input device 104.

Figure 8:
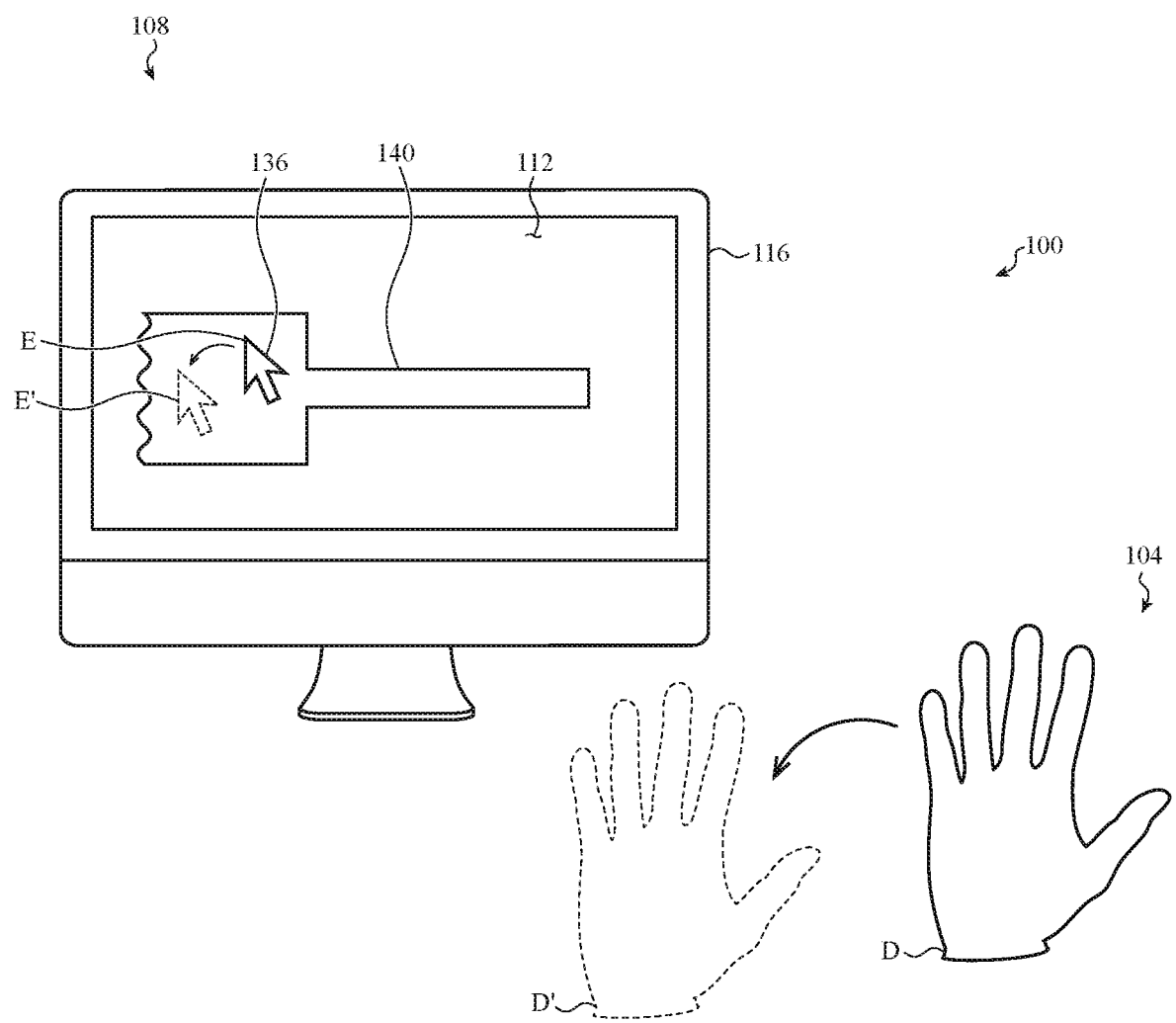
FIG. 8 depicts an example computing system in which a user input device is interconnected with a computing device, according to one embodiment.

FIG. 8 depicts an example computing system 100 including the user input device 104 and a computing device 108. The user input device 104 may be configured to be used with a variety of electronic devices. For example, the computing device 108 may be substantially any type of electronic device operable to receive user input, including a virtual reality device. Such input may facilitate the device's operation, such as executing a predetermined function in response to the input. Some examples of electronic devices may include a desktop computer, laptop, smart phone, portable media player, or the like. Other examples of electronic devices may include wearable devices (including watches, glasses, rings, or the like), health monitoring devices (including pedometers, heart rate monitors, or the like), and other electronic devices including digital cameras, printers, scanners, security systems or devices, or electronics for automobiles, among other electronic devices.

For purposes of illustration, FIG. 8 depicts a computing device 108 including a display 112 and an enclosure 116. In the case of the computing device 108 being a virtual reality device, the display 112 may be configured to encompass or substantially surround a user's eyes to create an immersive environment. In this regard, the display 112 may be constructed to generate an immersive three-dimensional environment. It should be noted that the computing device 108 may also include various other components, such as one or more ports (e.g., charging port, data transfer port, or the like), communications elements, additional input/output buttons, and so on. As such, the discussion of any computing device, such as computing device 108, is meant as illustrative only.

An indicium representative of, or responsive to, the user input device 104 may be represented at the display 112. As illustrated in FIG. 8, the user input device 104 may be represented at display 112 by the cursor 136 (e.g., the indicium). In one embodiment, sensing regions (e.g., primary sensing region 144, secondary sensing regions 148a-148e) may detect motion and/or a position of the user input device 104. For example, based on detected motion of the user input device 104 between the first and second positions, the user input device 104 may identify an input configuration and generate a user input signal that manipulates the cursor 136. To illustrate, the user input device 104 may generate a user input signal that causes the cursor 136 to move across the display 112.

To illustrate the foregoing, the user input device 104 is depicted in FIG. 8 at position D and the cursor 136 is depicted at position E. Position D for the user input device 104 may correspond to the current point or resting position of the user input device 104, and position E may correspond to a position of the cursor 136 depicted at the display 112 when the user input device 104 is in position D. In one instance, the user input device 104 may move from position D to position D'. In turn, the user input device 104 may generate a user input signal that causes the cursor 136 to move from position E to position E'. It will be appreciated that the above process may be subsequently repeated. For example, as the user input device 104 moves to other positions, the cursor 136 depicted at the display 112 may correspondingly move to facilitate near real time control of the cursor 136.

It will be appreciated that movements of the cursor 136 are presented for purposes of illustration only. In some instances, the cursor 136 may be a virtual representation of the user input device 104 (e.g., such as a virtual representation of a user's hand) represented by a virtual reality device. In this regard, as a user manipulates the user input device 104 through real space, the virtual representation of the user input device may correspondingly move. Further, movements of the user input device 104 may be represented in three-dimensional space. For example, a virtual reality device may represent the three-dimensional movements of the user input device 104 as the user input device 104 moves through real space.

As described above, the user input device 104 includes a haptic feedback structure that provides haptic feedback based on the detected position of the glove, the identified input configuration, and/or a received touch or force input. In this manner, the user input device 104 may generate haptic feedback that corresponds to the detected motion and/or positions of the user input device 104, an application executed by the computing system 108, and so on. For instance, as illustrated in FIG. 8, the display 112 may depict an object, such as virtual paint brush 140. The user input device 104 may be positioned such that the cursor 136 intersects and/or overlaps the brush 140 at the display 112. In this regard, the user input device 104 may be moved (e.g., from position D to position D') and the haptic feedback structure may provide haptic feedback associated with one or more attributes of the brush 140 over which the cursor 136 is traversed. For example, the haptic feedback structure may generate haptic feedback to simulate the texture of brush bristles.

FIGS. 9A-17B depict the user input device 104 according to various input configurations, and each is discussed in more detail below. As described above, the user input device 104 may be manipulated into a variety of input configurations that allow a user to control a computing device, for example, such as computing device 108 (e.g., as depicted in FIG. 8). For example, a first portion of the flexible fabric 128 may be moveable relative to a second portion of the flexible fabric 128 to define any of the input configurations described in relation to FIGS. 9A-17B.

Figure 9A:
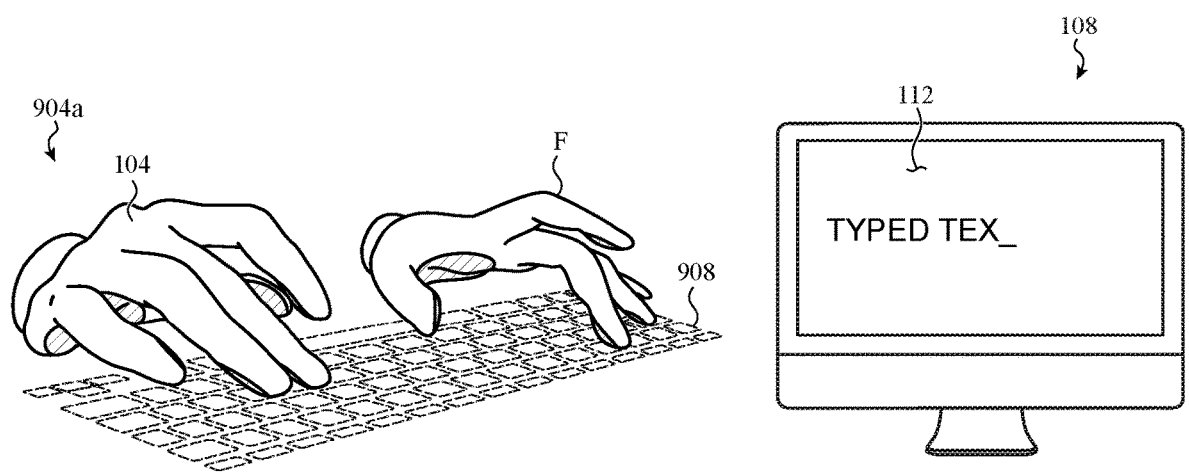
FIG. 9A depicts an embodiment of an input configuration for typing on a keyboard, according to one embodiment.
Figure 9B:
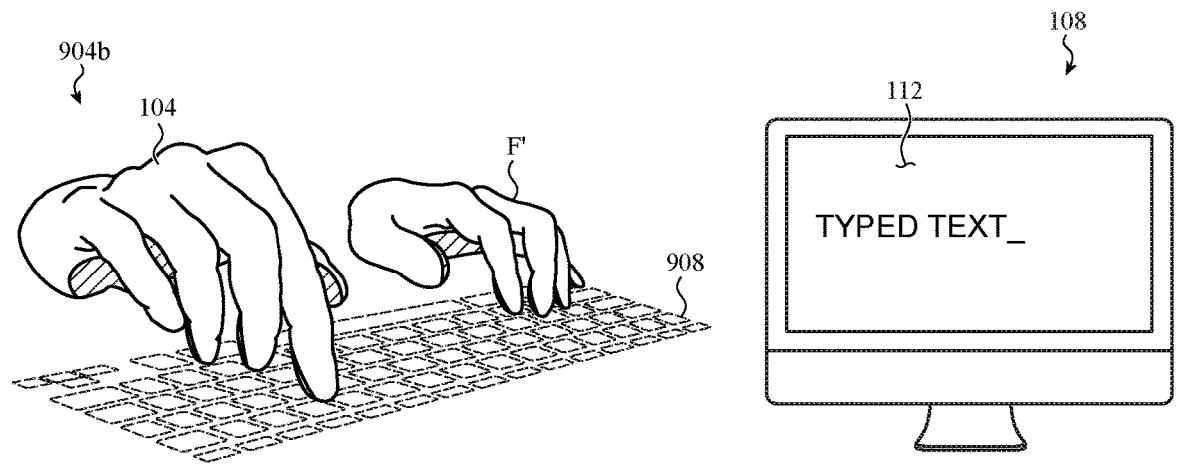
FIG. 9B depicts an embodiment of an input configuration for typing on a keyboard, according to another embodiment.

FIGS. 9A and 9B depict the user input device 104 typing on a virtual keyboard. For example, the user input device 104 may be manipulated into various input configurations relative to an array of input regions 908 in order to generate a user input signal corresponding to a keyboard command. The array of input regions 908 may be virtual and defined relative to the user input device 104, such that a keyboard surface may be established free of any defined or static user input surface. In other embodiments, the array of input regions 908 may be illuminated by the user input device 104, the computing device 108, or another associated electronic device.

The user input device 104 may detect input configurations indicative of keystroke commands. For example, the user input device 104 may detect motion of the user input device 104 relative to one or more regions of the array of input regions 908. The user input device 104 may then generate a user input signal based on the association of the detected motion with a corresponding input region. Additionally or alternatively, the user input signal may be initiated in response to receiving a touch and/or force input proximal to the flexible fabric 128 while the user input device 104 is positioned relative to a particular region of the array of input regions 908. In either event, haptic feedback may be provided through a haptic feedback structure of the user input device 104.

By way of illustration, FIG. 9A depicts the user input device 104 in an input configuration 904a, in which the user input device 104 is depicted adjacent to the array of input regions 908 at position F. Furthermore, FIG. 9B depicts user input device 104 in an input configuration 904b, in which the user input device 104 is depicted adjacent to the array of input regions 908 at position F'. The user input device 104 may detect the sequence of the input configurations 904a, 904b (e.g., corresponding to movement of the user input device 104 between positions F and F') in order to generate a user input signal corresponding to a keyboard command.

The display 112 may include information corresponding to the sequence of input configurations 904a, 904b. For example, when the user input device 104 is in input configuration 904a, the display 112 may depict the words "TYPED TEX_". In turn, when the user input device 104 is in the input configuration 904b, the display 112 may depict the words "TYPED TEXT_". In this regard, the display 112 may be updated as the user input device 104 is manipulated into a variety of positions.

Additionally or alternatively, a user may manipulate the user input device 104 to generate a user input signal corresponding to keyboard commands via sign language. For example, rather than manipulate the user input device 104 relative to a virtual keyboard (e.g., such as that represented by the array of input regions 908), the user input device 104 may be manipulated into an input configuration that resembles a hand performing a sign language gesture to generate a keyboard command. For example, as depicted in FIG. 9B, the input configuration 904b may correspond to a sign language gesture representative of the letter "t". In this regard, manipulation of the user input device 104 into configuration 904b may cause the letter "t" to be depicted at display 112. Accordingly, the computing device 108 may be controlled through sign language.

Figure 10A:
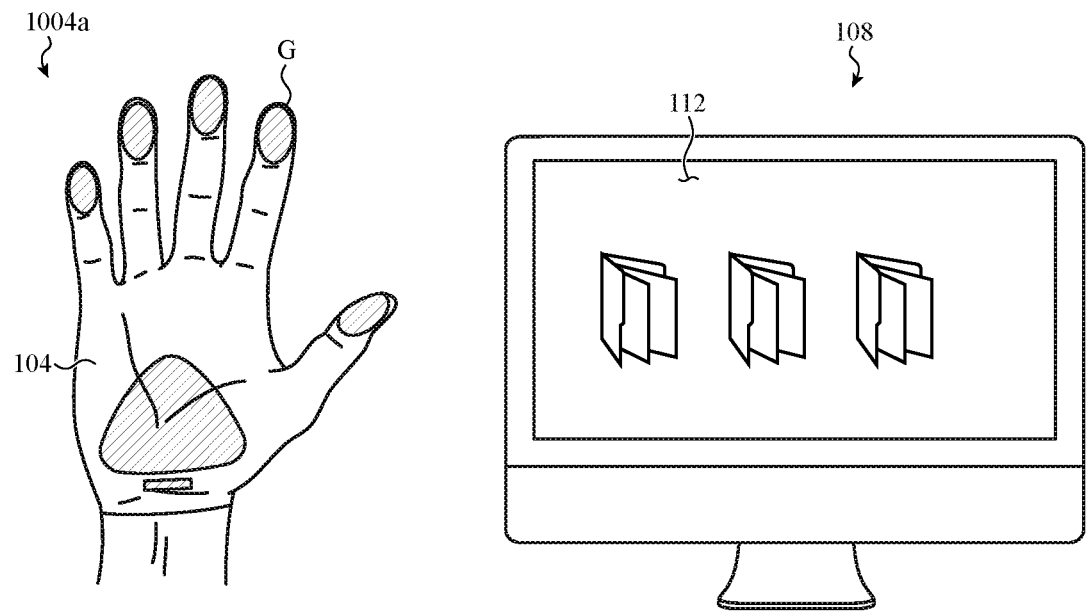
FIG. 10A depicts an embodiment of an input configuration for selecting an icon represented at an interconnected display, according to one embodiment.
Figure 10B:
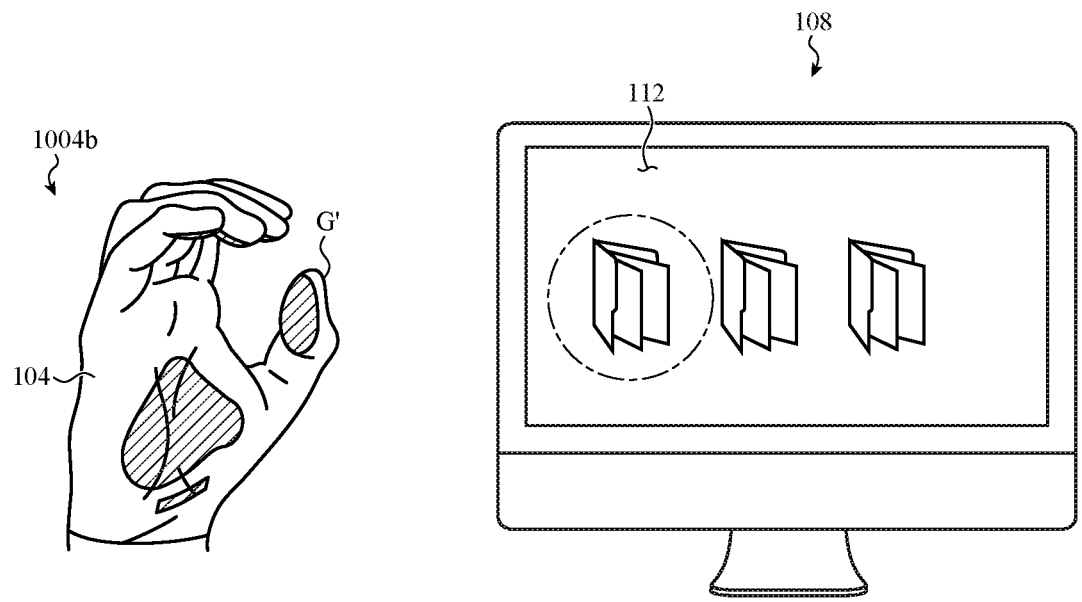
FIG. 10B depicts an embodiment of an input configuration for selecting an icon represented at an interconnected display, according to another embodiment.

FIGS. 10A and 10B depict the user input device 104 selecting a file represented by a computing device. In this regard, the user input device 104 may be manipulated into various input configurations to indicate a selection of information represented by a computing device.

By way of illustration, FIG. 10A depicts the user input device 104 in an input configuration 1004a, in which the user input device 104 resembles an open palm at position G. Furthermore, FIG. 10B depicts user input device 104 in an input configuration 1004b, in which the user input device 104 resembles a closed palm at position G'. The user input device 104 may detect the sequence of the input configurations 1004a, 1004b (e.g., corresponding to a movement of the user input device 104 between positions G and G') in order to generate a user input signal corresponding to selecting information represented by or on a computing device.

In this regard, the display 112 may include information corresponding to the input configurations 1004a, 1004b. For example, when the user input device 104 is in input configuration 1004a, the display 112 may depict the a file icon or other symbol representative of information stored at (or accessible by) the computing device 108. In turn, when the user input device 104 is in the input configuration 1004b, the display 112 may depict a symbol indicative of a selection of the file icon (e.g., such as a circle shown in FIG. 10B). In some instances, the user input device 104 may generate haptic feedback in response to manipulating the user input device 104 into the input configuration 1004*b*.

Figure 11A:
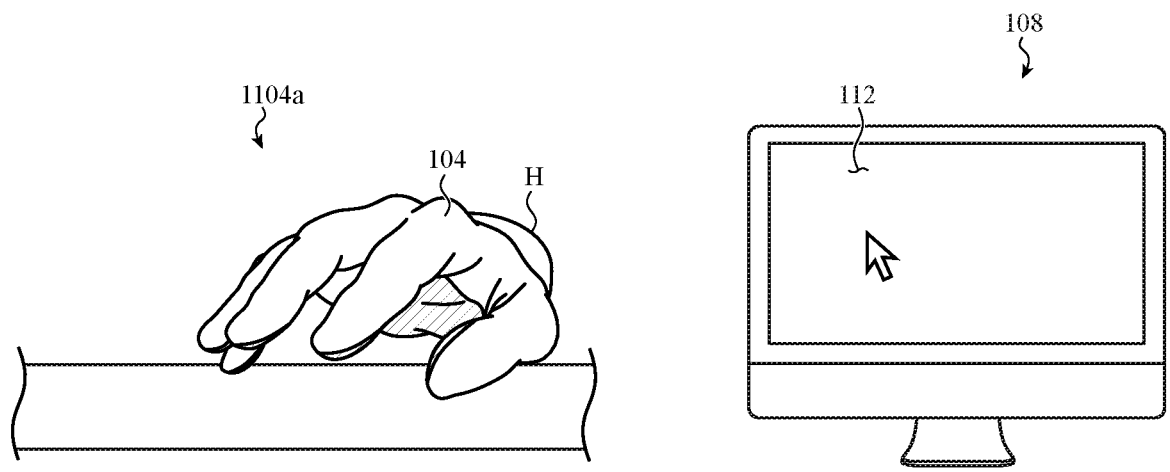
FIG. 11A depicts an embodiment of an input configuration for operating a computer mouse, according to one embodiment.
Figure 11B:
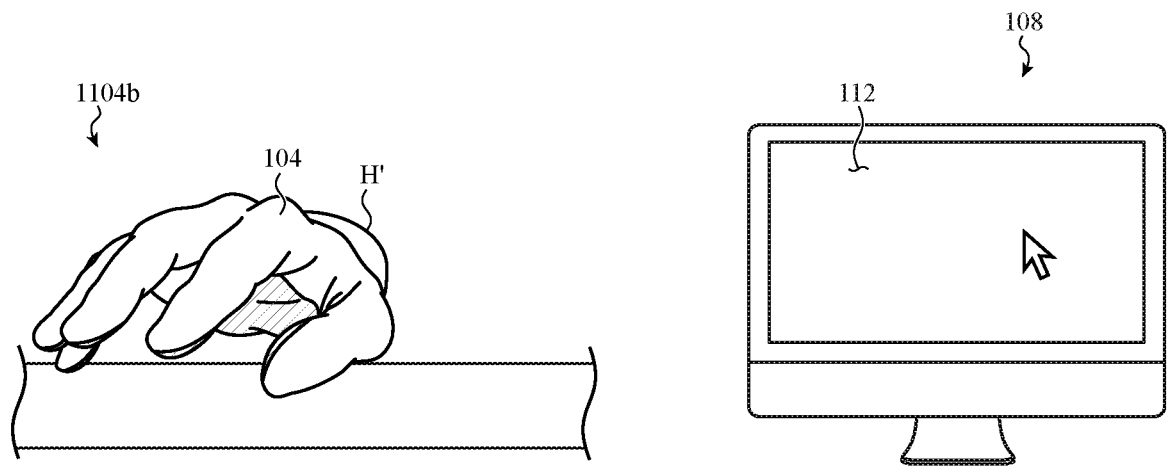
FIG. 11B depicts an embodiment of an input configuration for operating a computer mouse, according to another embodiment.

FIGS. 11A and 11B depict the user input device 104 resembling holding a computer mouse, although no mouse is present. In this regard, the user input device 104 may be manipulated into various input configurations to control a cursor or other indicium represented by a computing device.

By way of illustration, FIG. 11A depicts user input device 104 in an input configuration 1104*a*, in which the user input device 104 is depicted as resembling holding a computer mouse at position H. Furthermore, FIG. 11B depicts user input device 104 in an input configuration 1104*b*, in which the user input device 104 is depicted as resembling holding a computer mouse at position H'. The user input device 104 may detect the sequence of input configurations 1104*a*, 1104*b* (e.g., corresponding to a motion of the user input device 104 between positions H and H') in order to generate a user input signal corresponding to controlling a cursor at a computing device.

In this regard, the display 112 may include information corresponding to the sequence of input configurations 1104*a*, 1104*b*. For example, when the user input device 104 is in input configuration 1104*a*, the display 112 may depict a cursor in a first position. In turn, when the user input device 104 is in input configuration 1104*b*, the display 112 may depict a cursor in a second position. In this regard, the position of the cursor represented by the display 112 may be updated as the user input device 104 is manipulated into a variety of input configurations.

Figure 12A:
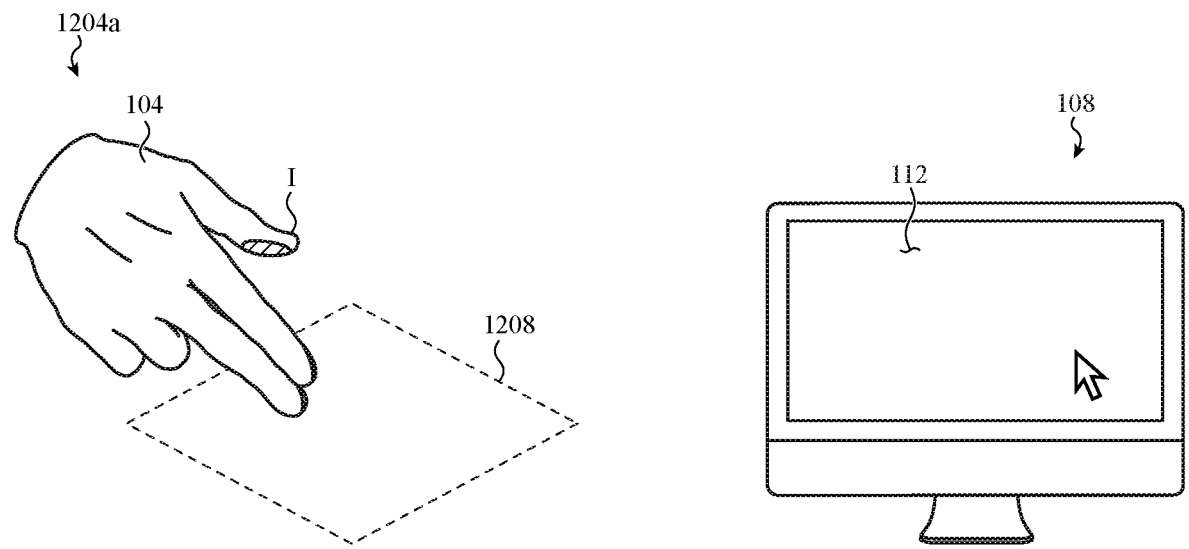
FIG. 12A depicts an embodiment of an input configuration for operating a computer track pad, according to one embodiment.
Figure 12B:
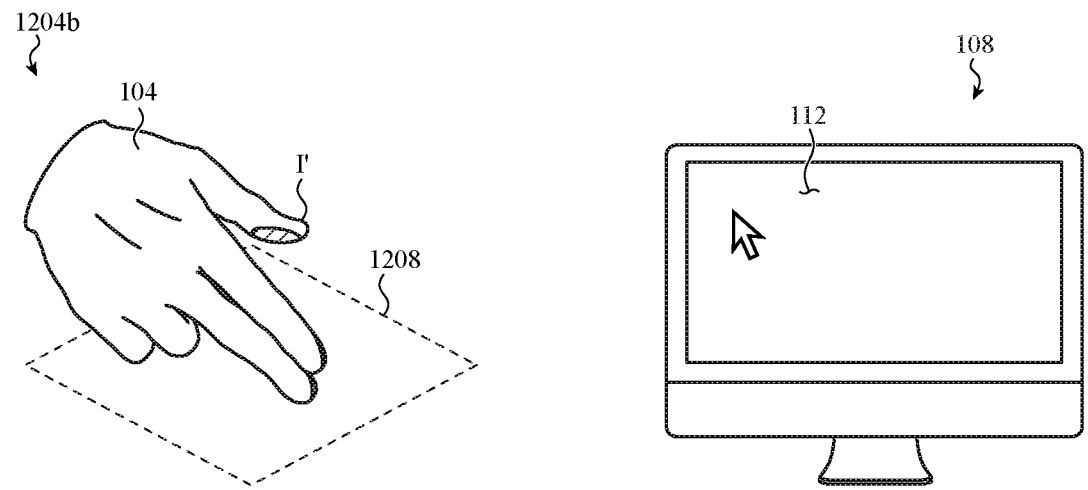
FIG. 12B depicts an embodiment of an input configuration for operating a computer track pad, according to another embodiment.

FIGS. 12A and 12B depict the user input device 104 resembling operating a computer trackpad, although no trackpad is present. The user input device 104 may be manipulated into various input configurations relative to a virtual trackpad 1208. This may allow the user input device 104 to control a cursor or other indicium represented by a computing device. The virtual trackpad 1208 may be defined relative to the user input device 104, such that a trackpad may be established free of any defined or static user input surface. In other embodiment, the virtual trackpad 1208 may be illuminated by the user input device 104, the computing device 108, or another associated electronic device.

By way of illustration, FIG. 12A depicts user input device 104 in an input configuration 1204*a*, in which the user input device 104 is depicted as resembling operating a computer trackpad at position I. Furthermore, FIG. 12B depicts user input device 104 in an input configuration 1204*b*, in which the user input device 104 is depicted as resembling operating a computer trackpad at position I'. The user input device 104 may detect the sequence of input configurations 1204*a*, 1204*b* (e.g., corresponding to a motion of the user input device 104 between positions I and I') in order to generate a user input signal corresponding to controlling a cursor at a computing device 108.

In this regard, the display 112 may include information corresponding to the sequence of input configurations 1204*a*, 1204*b*. For example, when the user input device 104 is in input configuration 1204*a*, the display 112 may depict a cursor in a first position. In turn, when the user input device 104 is in input configuration 1204*b*, the display 112 may depict a cursor in a second position. In this regard, the position of the cursor represented by the display 112 may be updated as the user input device 104 is manipulated into a variety of input configurations.

Figure 13A:
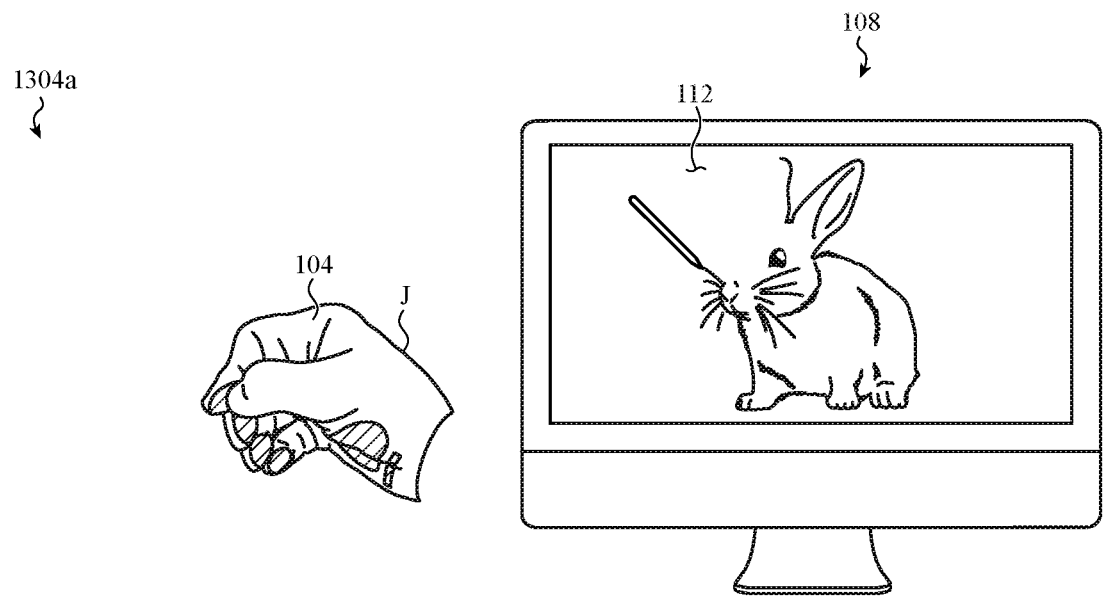
FIG. 13A depicts an embodiment of an input configuration for holding a pencil represented at an interconnected display, according to one embodiment.
Figure 13B:
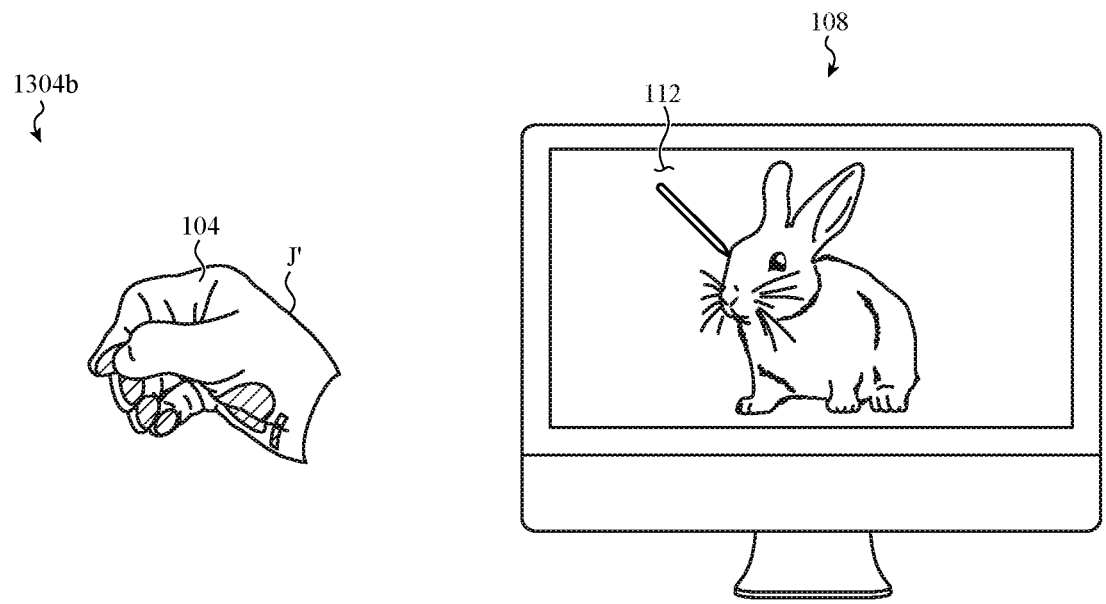
FIG. 13B depicts an embodiment of an input configuration for holding a pencil represented at an interconnected display, according to another embodiment.

FIGS. 13A and 13B depict the user input device 104 resembling holding a pencil, although no pencil is present. In this regard, the user input device 104 may be manipulated into various input configurations to control a pencil or other drawing implement represented by a computing device.

By way of illustration, FIG. 13A depicts user input device 104 in an input configuration 1304*a*, in which the user input device 104 is depicted as resembling holding a pencil at position J. Furthermore, FIG. 13B depicts user input device 104 in an input configuration 1304*b*, in which the user input device 104 is depicted as resembling holding a pencil at position J'. The user input device 104 may detect the sequence of input configurations 1304*a*, 1304*b* (e.g., corresponding to a motion of the user input device 104 between positions J and J') in order to generate a user input signal corresponding to controlling a cursor at a computing device 108.

In this regard, the display 112 may include information corresponding to the sequence of input configurations 1304*a*, 1304*b*. For example, when the user input device 104 is in input configuration 1304*a*, the display 112 may depict a drawing implement in a first position. In turn, when the user input device 104 is in input configuration 1304*b*, the display 112 may depict a drawing implement in a second position. In this regard, the position of the drawing implement represented by the display 112 may be updated as the user input device 104 is manipulated into a variety of input configurations. Accordingly, the user input device 104 may be used to draw a picture on the display 112.

Figure 14A:
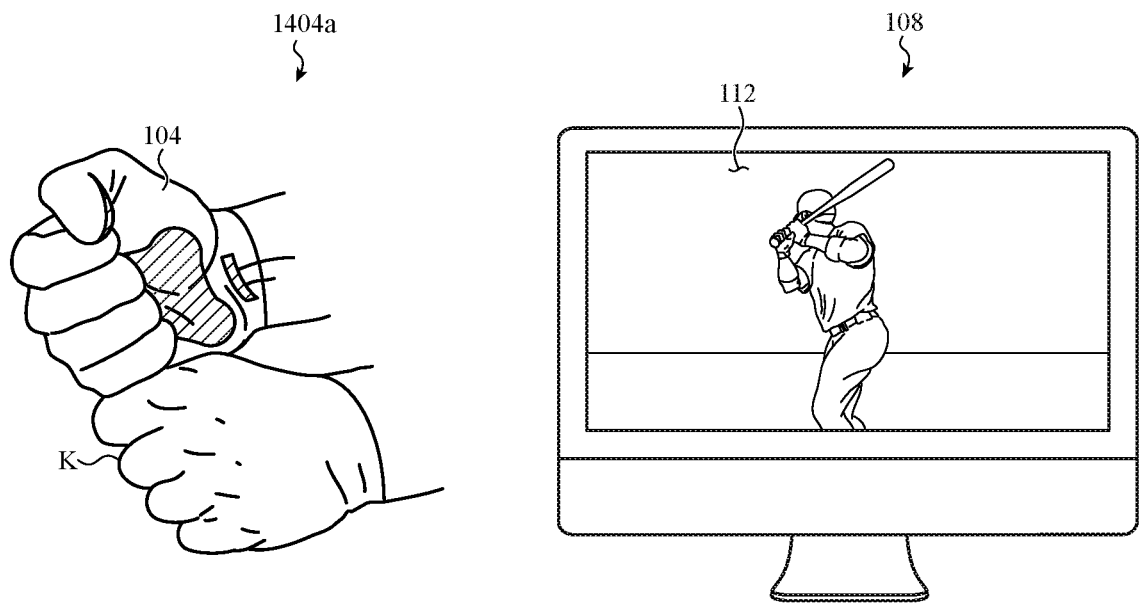
FIG. 14A depicts an embodiment of an input configuration for holding a baseball bat represented at an interconnected display, according to one embodiment.
Figure 14B:
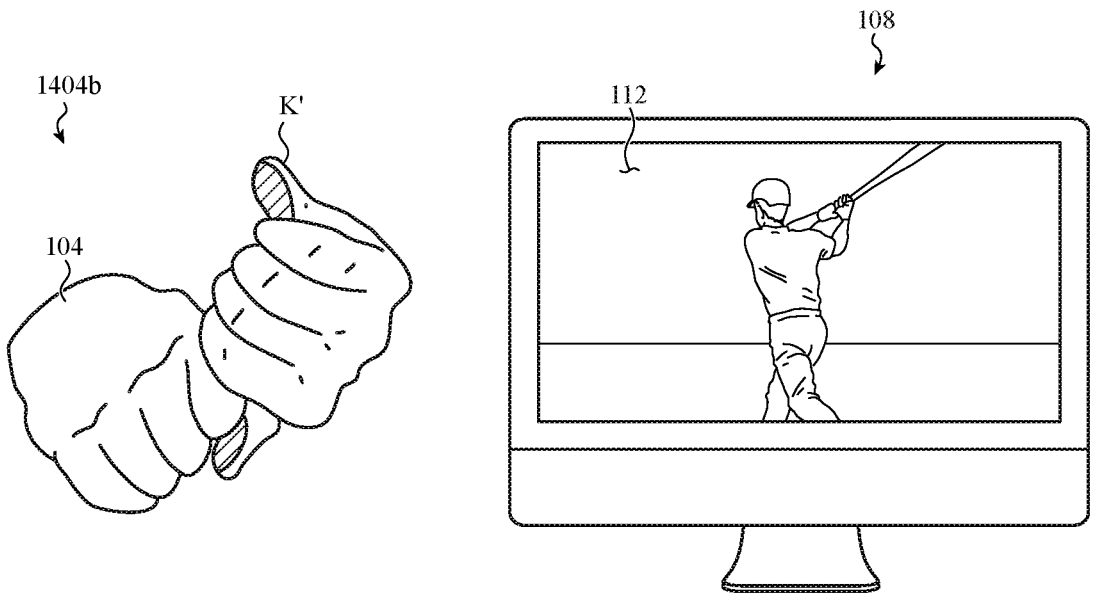
FIG. 14B depicts an embodiment of an input configuration for holding a baseball bat represented at an interconnected display, according to another embodiment.

FIGS. 14A and 14B depict the user input device 104 resembling holding a baseball bat, although no baseball bat is present. In this regard, the user input device 104 may be manipulated into various input configurations to control a function of a computer application executing on a computing device, such as an application directed to playing baseball.

By way of illustration, FIG. 14A depicts user input device 104 in an input configuration 1404*a*, in which the user input device 104 is depicted as resembling holding a baseball bat at position K. Furthermore, FIG. 14B depicts user input device 104 in an input configuration 1404*b*, in which the user input device 104 is depicted as resembling holding a baseball bat at position K'. The user input device 104 may detect the sequence of the input configurations 1404*a*, 1404*b* (e.g., corresponding to a motion of the user input device 104 between positions K and K') in order to generate a user input signal corresponding to controlling the computer application (e.g., corresponding to swinging a baseball bat).

In this regard, the display 112 may include information corresponding to the sequence of input configurations 1404*a*, 1404*b*. For example, when the user input device 104 is in input configuration 1404*a*, the display 112 may depict a batter holding a baseball bat in an upright or "ready" position. In turn, when the user input device 104 is in the input configuration 1404*b*, the display 112 may depict a batter holding a baseball bat in an extended or "swung" position. In this regard, the display 112 may be updated as the user input device 104 is manipulated into a variety of input configurations.

In one embodiment, the computing device 108 may be a virtual reality device. In this regard, the display 112 may be configured to create an immersive three-dimensional environment that simulates the experience of playing baseball. For example, the display 112 may be modified to depict a virtual representation of the user's hand holding a virtual baseball bat. In this regard, the user may interact with the virtual environment in a manner analogous to the user's interaction with a corresponding physical environment. For example, the user may manipulate the user input device 104 to resemble swinging a baseball bat (although no baseball bat is present). In turn, the virtual environment represented by the virtual reality device may correspondingly represent the virtual representation of the user's hand as swinging the virtual baseball bat.

Figure 15A:
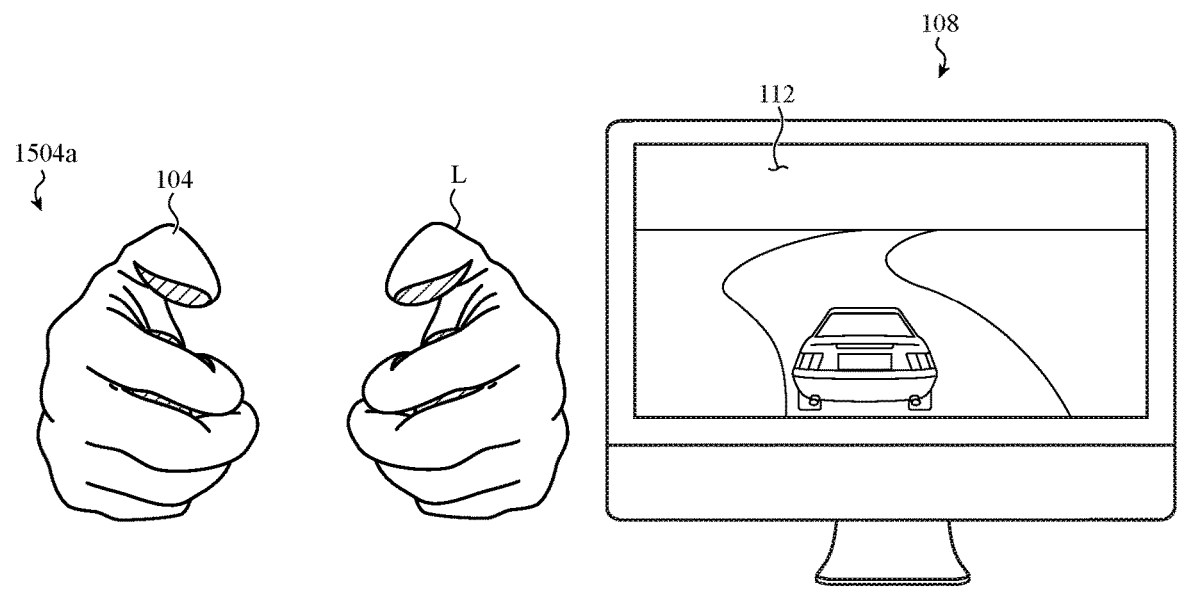
FIG. 15A depicts an embodiment of an input configuration for holding a game console controller, according to one embodiment.
Figure 15B:
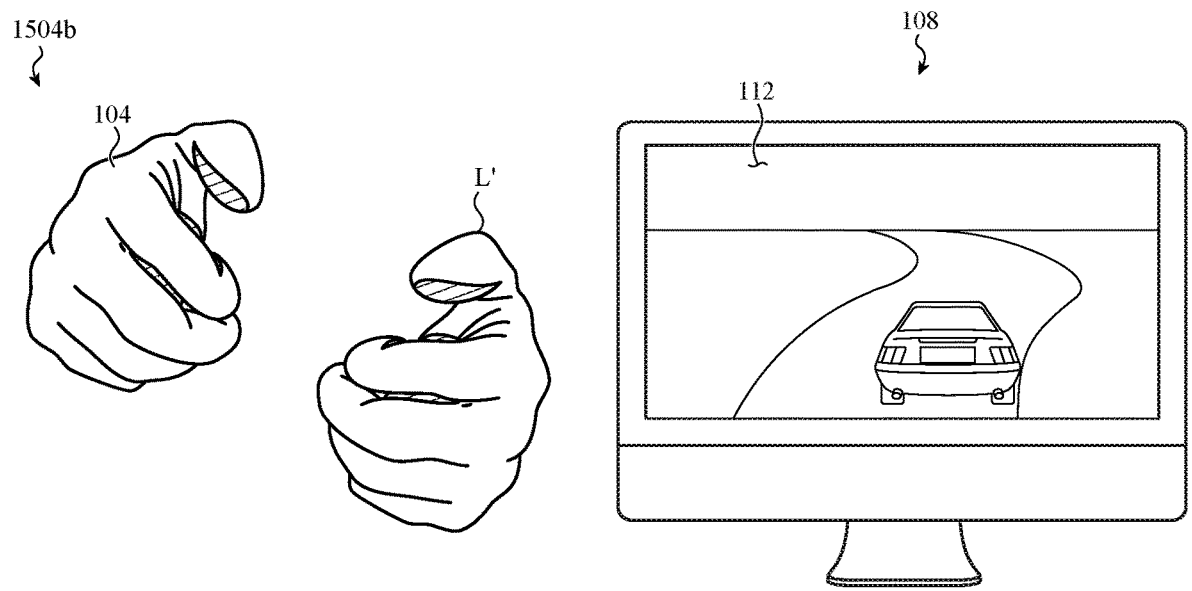
FIG. 15B depicts an embodiment of an input configuration for holding a game console controller, according to another embodiment.

FIGS. 15A and 15B depict the user input device 104 resembling holding a video game controller, although no video game controller is present. In this regard, the user input device 104 may be manipulated into a variety of input configurations to control a function of a computer application that is executing on a computing device, such as an application directed to racing a car.

By way of illustration, FIG. 15A depicts user input device 104 in an input configuration 1504a, in which the user input device 104 is depicted as resembling holding a video game controller at position L. Furthermore, FIG. 15B depicts user input device 104 in an input configuration 1504b, in which the user input device 104 is depicted as resembling holding a video game controller at position L'. The user input device 104 may detect the sequence in the input configurations 1504a, 1504b (e.g., corresponding to a motion of the user input device 104 between positions L and L') in order to generate a user input signal corresponding to controlling the computer application (e.g., corresponding to steering a racecar).

In this regard, the display 112 may include information corresponding to the sequence of input configurations 1504a, 1504b. For example, when the user input device 104 is in input configuration 1504a, the display 112 may depict a racecar in a first position. In turn, when the user input device 104 is in the input configuration 1504b, the display 112 may depict the racecar in a second position. In this regard, the position of the racecar represented at the display 112 may be updated as the user input device 104 is manipulated into a variety of input configurations.

In one embodiment, the computing device 108 may be a virtual reality device. In this regard, the display 112 may be configured to create an immersive three-dimensional environment that simulates the experience of driving a racecar. For example, the display 112 may be modified to depict a virtual representation of the user's hand holding a virtual steering wheel. In this regard, the user may interact with the virtual environment in a manner analogous to the user's interaction with a corresponding physical environment. For example, the user may manipulate the user input device 104 to resemble turning a steering wheel (although no steering wheel is present). In turn, the virtual environment represented by the virtual reality device may correspondingly represent the virtual representation of the user's hand as turning the virtual steering wheel.

Figure 16A:
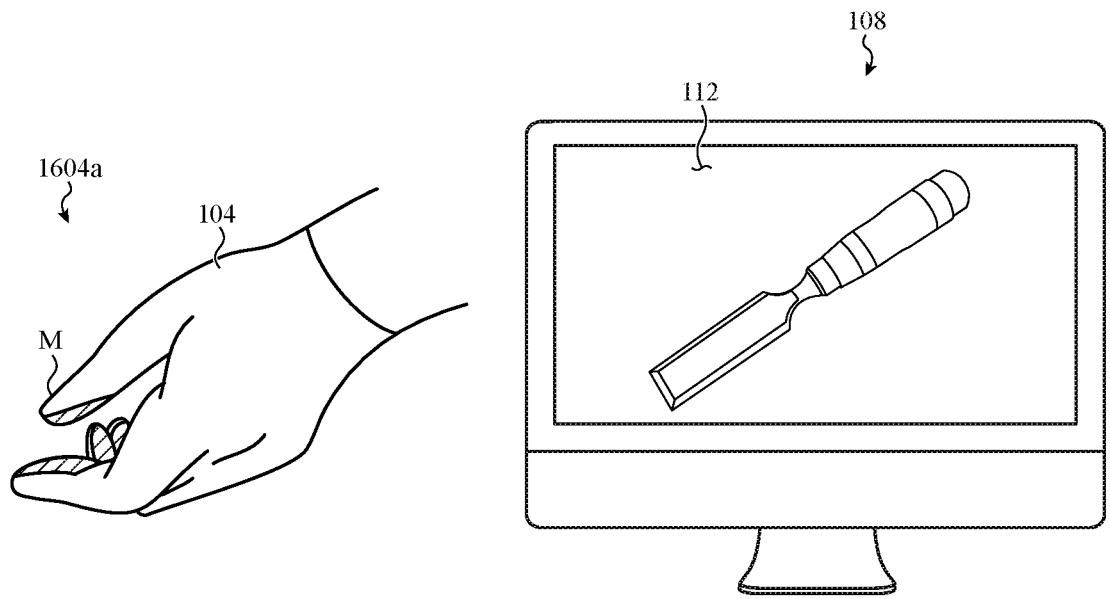
FIG. 16A depicts an embodiment of an input configuration for holding a sculpting tool represented at an interconnected display, according to one embodiment.
Figure 16B:
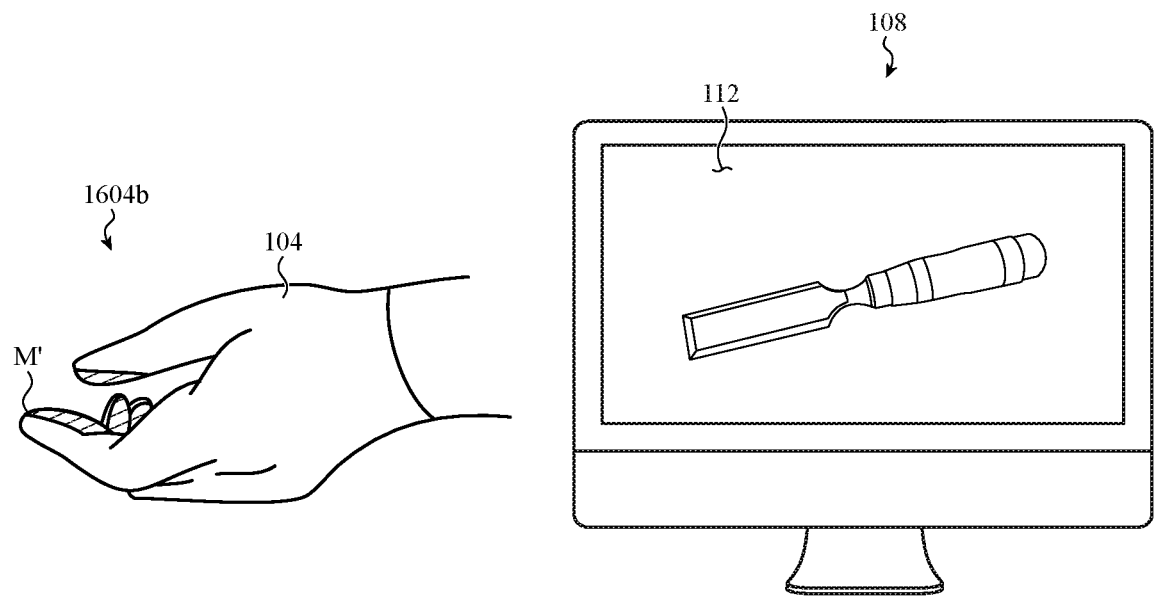
FIG. 16B depicts an embodiment of an input configuration for holding a sculpting tool represented at an interconnected display, according to another embodiment.

FIGS. 16A and 16B depict the user input device 104 resembling holding a sculpting tool, although no sculpting tool is present. In this regard, the user input device 104 may be manipulated into a variety of input configurations to interact with an environment represented by or on a computing device.

By way of illustration, FIG. 16A depicts user input device 104 in an input configuration 1604a, in which the user input device 104 is depicted as resembling holding a sculpting tool at position M. Furthermore, FIG. 16B depicts user input device 104 in an input configuration 1604b, in which the user input device 104 is depicted as resembling holding a sculpting tool at position M'. The user input device 104 may detect the sequence of the input configurations 1604a, 1604b (e.g., corresponding to a motion of the user input device 104 between positions M and M') in order to generate a user input signal corresponding to an interaction with an environment represented by or on a computing device (e.g., corresponding to shaping a virtual block of clay with a virtual sculpting tool).

The display 112 may include information corresponding to the sequence of input configurations 1604a, 1604b. For example, when the user input device 104 is in input configuration 1604a, the display 112 may depict the sculpting tool in a first position. In turn, when the user input device 104 is in the input configuration 1604b, the display 112 may depict the sculpting tool in a second position.

In one embodiment, the user input device 104 may be operated to manipulate an environment depicted at the display 112 (e.g., via the depiction of the sculpting tool). For example, the display 112 may depict a block of clay having a first texture. The user input device 104 may be manipulated into various input configurations to cause a sculpting tool depicted at the display 112 to correspondingly move. In turn, the movements of the depicted sculpting tool may cause the first texture of the clay block to be transformed into a second texture.

Haptic feedback may be provided based on the modification of the environment depicted at the display 112. For example, the user input device 104 may be manipulated into an input configuration indicative of simulating a surface texture of an object represented at the display 112 (e.g., an input configuration resembling an open palm). The user input device 104 may be manipulated such that an indicium representing the user input device 104 may be depicted at the display 112 at a position intersecting the portion of the block of clay with the second surface texture. A haptic feedback structure may be configured to provide haptic feedback to simulate the second surface texture. In this manner, a contour of a texture that is "virtually" created by operation of the user input device 104 may be simulated at the user input device 104 via the haptic feedback structure.

It will be appreciated that the input configuration corresponding to the sculpting tool is presented for purposes of non-limiting illustration. In other embodiments, the user input device 104 may be manipulated into any other appropriate input configuration to interact with an environment represented by or on a computing device.

Figure 17A:
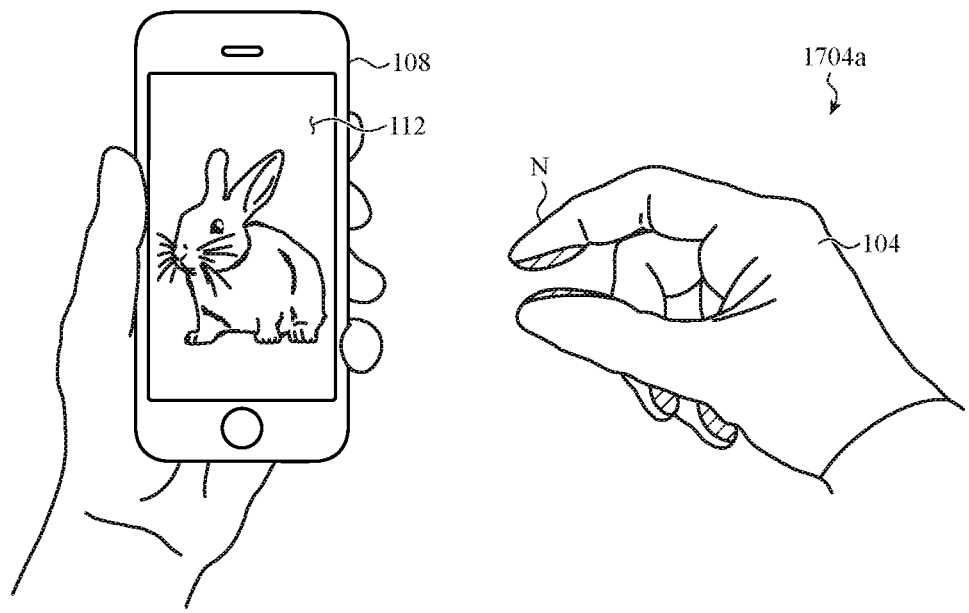
FIG. 17A depicts an embodiment of an input configuration for manipulating an object represented at an interconnected display, according to one embodiment.
Figure 17B:
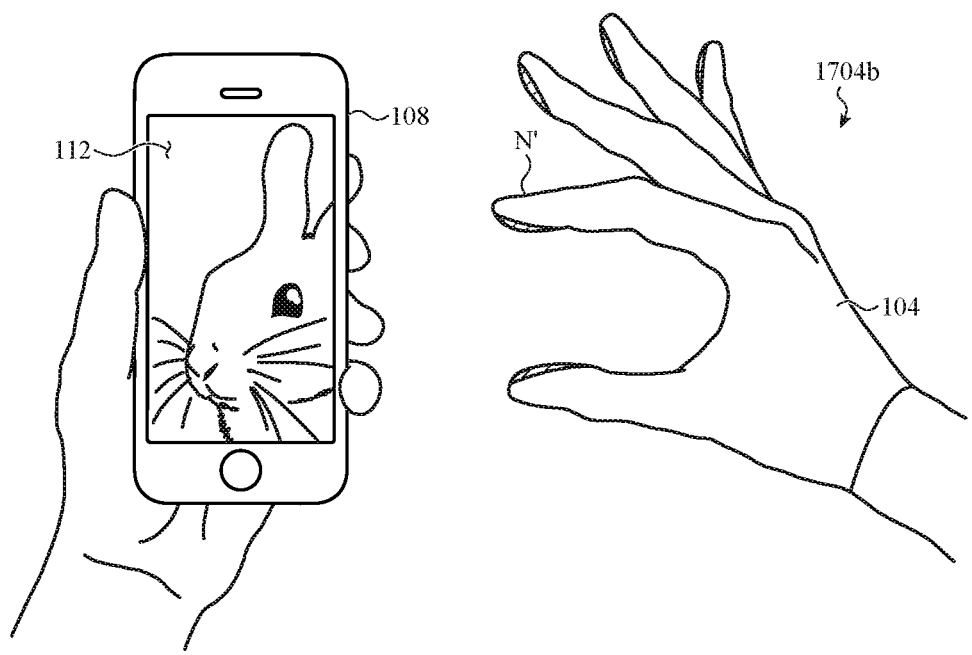
FIG. 17B depicts an embodiment of an input configuration for manipulating an object represented at an interconnected display, according to another embodiment.

FIGS. 17A and 17B depict the user input device 104 manipulating an object represented at an interconnected display. For example, the user input device 104 may be used to manipulate objects represented on a display of a portable electronic device.

By way of illustration, FIG. 17A depicts user input device 104 in an input configuration 1704a, in which the user input device 104 is depicted in position N as manipulating an object represented at display 112. Furthermore, FIG. 17B depicts the user input device 104 in an input configuration 1704b, in which the user input device 104 is depicted in position N' manipulating an object represented at display 112. The user input device 104 may detect the sequence of input configurations 1704a, 1704b (e.g., corresponding to a motion of the user input device 104 between positions N and N') in order to generate a user input signal corresponding to controlling a cursor at a computing device.

In this regard, the display 112 may include information corresponding to the sequence of input configurations 1704a, 1704b. For example, when the user input device 104 is in input configuration 1704a, the display 112 may depict an object at display 112 in a first position. In turn, when the user input device 104 is in input configuration 1704b, the display 112 may depict an object at display 112 in a second position. As shown in FIGS. 17A and 17B, the sequence of input configurations 1704a, 1704b may cause the object represented at display 112 to enlarge. In other embodiments, the sequence of input configurations 1704a, 1704b may cause the computing device 108 to perform one or more functions, such that a user may operate the computing device 108 (e.g., causing the computing device 108 to select or perform one or more functions) using the user input device 104.

Figure 18A:
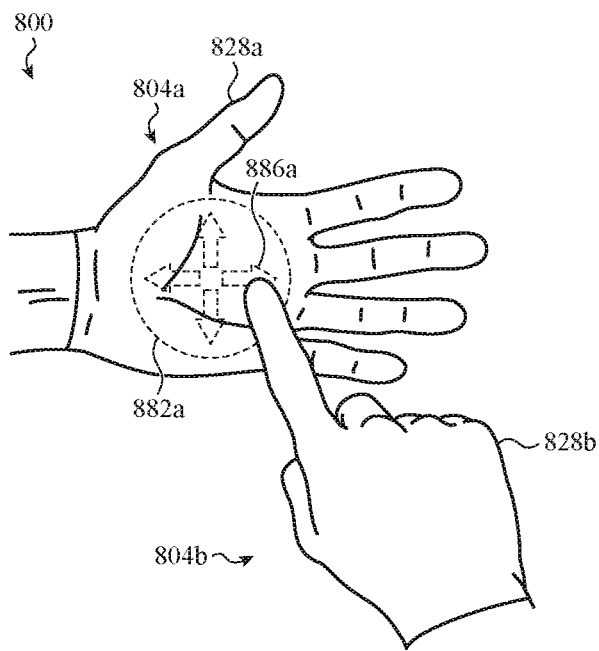
FIG. 18A depicts an example computing system with a user input device having a dynamically configurable light source, according to one embodiment.
Figure 18B:
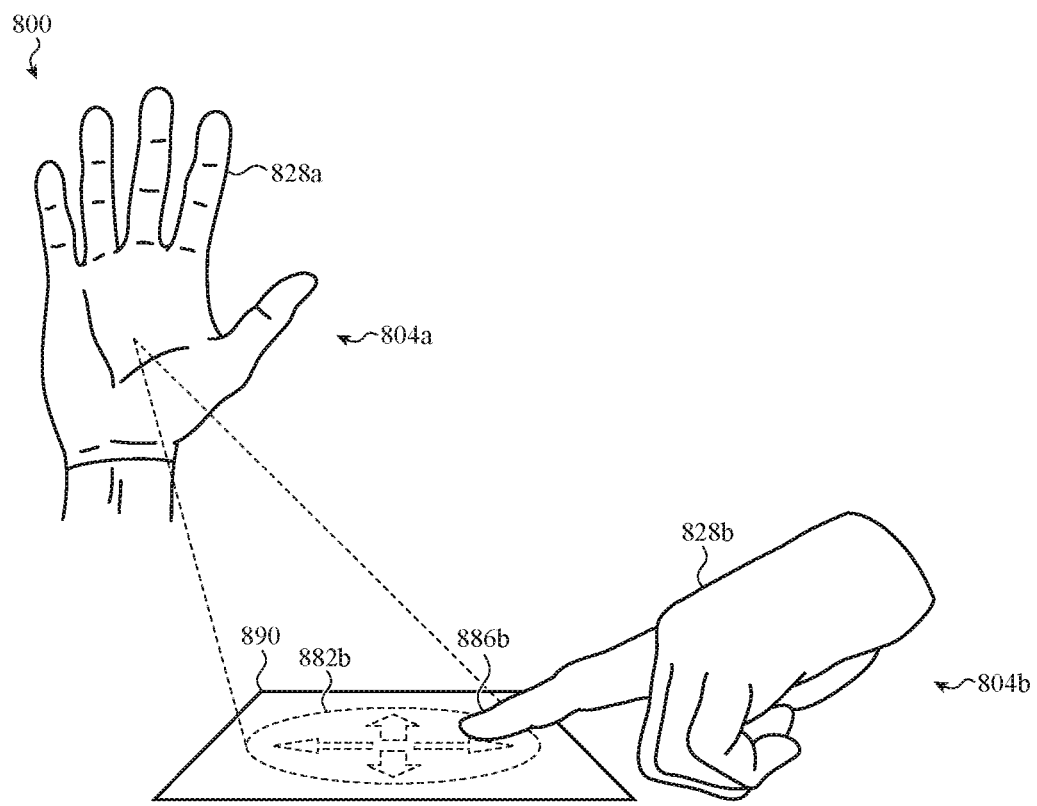
FIG. 18B depicts an example computing system with a user input device having a dynamically configurable light source, according to another embodiment.

FIGS. 18A-18B depict an example computing system 800 including user input devices 804a and 804b (e.g., the computing system 800 may be defined as a set of user input devices 804a, 804b). The user input devices 804a, 804b may be substantially analogous to the user input device 104 described with respect to FIG. 1. For example, the user input devices 804a, 804b may include flexible fabrics 828a, 828b configured for attachment to a user, which in some embodiments may be a glove. The user input devices 804a, 804b may be configured to detect an input configuration of the user input devices 804a, 804b (or portions thereof) for use in controlling a computing device. For example, the user input devices 804a, 804b may identify an input configuration and generate a corresponding user input signal. Accordingly, the user input devices 804a, 804b may include similar software, firmware, and/or hardware components as that of the user input device 104, including a haptic feedback structure, primary sensing regions, secondary sensing regions, strain-sensitive elements, capacitive arrays, and so on.

Notwithstanding the foregoing similarities, the user input devices 804a, 804b may include one or more light sources disposed below the flexible fabrics 828a, 828b. The light sources may be configured to display various markings, indicia, symbols, or the like indicative of various user input regions at portions of the flexible fabrics 828a, 828b. Additionally or alternatively, the light sources may be configured to project various markings, indicia, symbols, or the like indicative of various user input regions at a surface of the user input devices 804a, 804b. In some instances, the flexible fabrics 828a, 828b may be or resemble a microfiber surface when the light source is in a deactivated state (e.g., the light source may be concealed below the flexible fabrics 828a, 828b). A pattern of microperforations (e.g., visually undetectable apertures within the flexible fabrics 828a, 828b) may allow light to propagate through the flexible fabrics 828a, 828b to display and/or project an output illuminating or otherwise obtaining one or more user input regions.

With reference to FIG. 18A, the user input device 804a may include a light source configured to display a user input surface 882a having an array of user input regions contained therein (such as the user input region 886a) at a surface of the flexible fabric 828a. Each user input region may include various markings, symbols, or other indicia to indicate a function associated with the user input region. For example, in the depicted embodiment of FIG. 18A, the user input region 886a may be configured to resemble an arrow, for example, for controlling an aspect of a computing device.

User input devices 804a, 804b may operate in conjunction to generate a user input signal for use in controlling a computing device. For example, an input configuration of the user input device 804b may be detected in relation to the user input surface 882a displayed at user input device 804a. Based on the position of the user input device 804b, or a portion thereof, a user input signal may be generated for use in controlling the computing device according to a predetermined function associated with the user input region with which the motion was detected.

With reference to FIG. 18B, the user input device 804b may include a light source configured to project a user input surface 882b having an array of user input regions contained thereon (such as the user input region 886b) at any adjacently disposed surface (such as surface 890). Each user input region may include various markings, symbols, or other indicia to indicate a function associated with the user input region. For example, in the indicated embodiment of FIG. 18B, the user input region 886b may be configured to resemble an arrow, for example, for controlling an aspect of a computer application depicted at the display 112.

In this regard, analogous to the functionality described in relation to FIG. 18A, the user input devices 804a, 804b may operate in conjunction to generate a user input signal for controlling the computing device 108. For example, the position of the user input device 804b may be detected in relation to the user input surface 882b projected onto a surface 890. Based on the position of the user input device 804b, a user input signal may be generated to control a computing device.

It will be appreciated that the user input regions 886a, 886b are described as non-limiting example embodiments. In other embodiments, the light source may be dynamically configured to display various other markings, indicia, symbols, or the like, as may be appropriate for controlling a computing device. Additionally or alternatively, the illuminated user input region may be associated with a haptic element that provides haptic feedback in response to a touch and/or force input at the user input region.

Figure 19A:
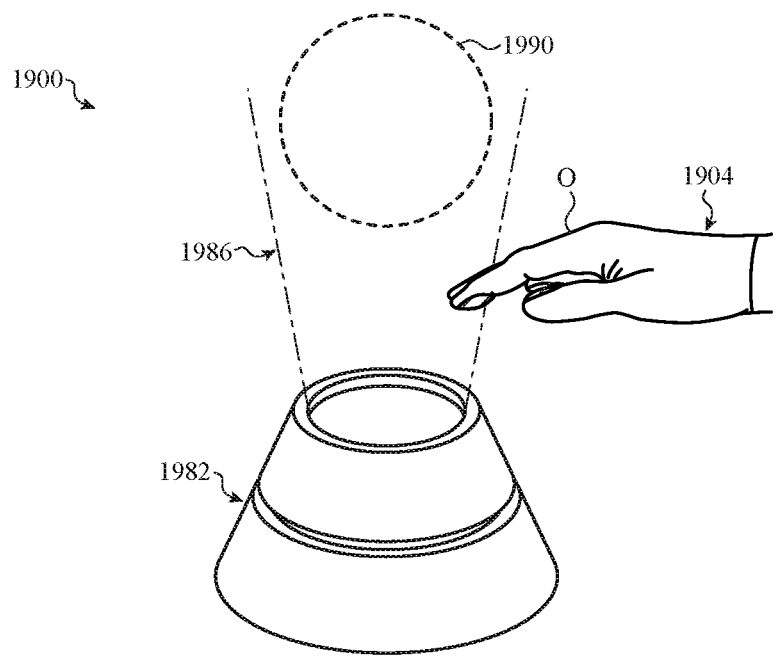
FIG. 19A depicts a user input device interacting with a holographic projection, according to one embodiment.
Figure 19B:
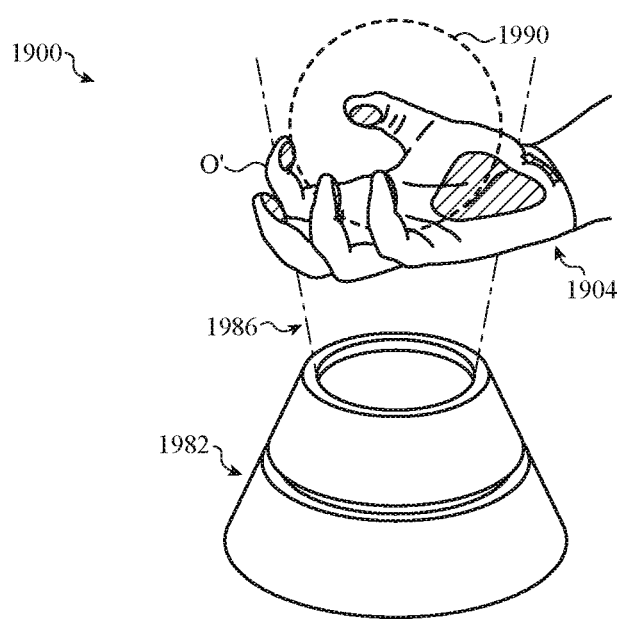
FIG. 19B depicts a user input device interacting with a holographic projection, according to another embodiment.

FIGS. 19A-19B depict an example computing system 1900 including user input device 1904 and virtual reality device 1982. The user input device 1904 may be substantially analogous to the user input device 104 described with respect to FIG. 1. For example, the user input device 1904 may include, or be defined by, flexible fabrics configured for attachment to a user, which in some embodiments may be a glove. The user input device 1904 may be configured to detect an input configuration of the user input device 1904 (or portions thereof) to control a computing or virtual reality device. For example, the user input device 1904 may identify an input configuration and generate a corresponding user input signal. Accordingly, the user input device 1904 may include similar software, firmware, and/or hardware components as that of the user input device 104, including a haptic feedback structure, primary sensing regions, secondary sensing regions, strain-sensitive elements, capacitive arrays, and so on.

The virtual reality device 1982 may be a computing device substantially analogous to the computing device 108 described with respect to FIG. 8. For example, the virtual reality device 1982 may be substantially any type of electronic device operable to receive user input. Accordingly, the user input device 1904 may be used to control an operation of the virtual reality device 1982.

The virtual reality device 1982 may be configured to produce a holographic projection 1986. The virtual reality device 1982 may produce the holographic projection 1986 using various lights, lasers, or other optical effects that cause a two-dimensional or three-dimensional image to appear in real space. The virtual reality device 1982 may produce the holographic projection 1986 in real space free from any defined or static screen or user input surface. The holographic projection 1986 may represent a virtual environment with which a user may interact using the user input device 1904. In this regard, the virtual reality device 1982 may dynamically depict various objects within the holographic projection 1986 that the user may interact with or otherwise manipulate using the user input device 1904. As shown in FIGS. 19A-19B, the holographic projection depicts a virtual sphere 1990.

The user input device 1904 may interact with the holographic projection 1986 in order to control a function of the virtual reality device 1982 or other interconnected computing device. As one example, the user input device 1904 may be manipulated into a variety of input configurations relative to one or more portions of the holographic projection 1986 to control a function of the virtual reality device 1982. By way of illustration, FIG. 19A depicts user input device 1904 in an input configuration, in which the user input device 1904 is depicted as partially intersecting the holographic projection 1986 at position O. Furthermore, FIG. 19B depicts user input device 1904 in an input configuration, in which the user input device 1904 is depicted as adjacent to the virtual sphere 1990 at position O'. The user input device 1904 may detect the sequence of movements of the user input device 1904 between positions O and O' in order to generate a user input signal corresponding to controlling a function of the virtual reality device 1982.

To illustrate, the virtual sphere 1990 may represent an object in a virtual environment, such as a virtual basketball in a video game directed to playing basketball. At position O, the user input device 1904 may intersect a portion of the holographic projection 1986 to initiate a video game in which a user attempts to catch the virtual basketball. At position O', the user input device 1904 may resemble a hand that is holding a basketball, although only the virtual basketball is present. In this manner, the progression of movements between O and O' may be used to control a function of the virtual reality device 1982 (e.g., by indicating that the user successfully caught the virtual basketball). In other embodiments, the virtual sphere 1990 may represent other virtual objects, including objects corresponding to navigating a computer menu structure, as may be appropriate for a given application (e.g., the virtual sphere 1990 may resemble a file icon that may be manipulated by the user input device 1904 to cause the virtual reality device 1982 to execute or access information associated with the file icon).

The user input device 1904 may generate various haptic effects to create an immersive environment corresponding to the virtual environment represented by the virtual reality device 1982. The user input device 1904 may include a haptic feedback structure similar to the haptic feedback structure 164 described with respect to FIGS. 2 and 3. In this regard, the user input device 1904 may produce tactile sensations that replicate the experience of interacting with an object or environment that is depicted within the holographic projection 1986. As an illustration, the user input device 1904 may produce various vibrotactile effects indicative of a user holding a basketball when the user input device 1904 is at position O'. This may include producing vibrotactile effects that resemble the texture, contour, and weight of a basketball, among other appropriate effects.

Figure 20A:
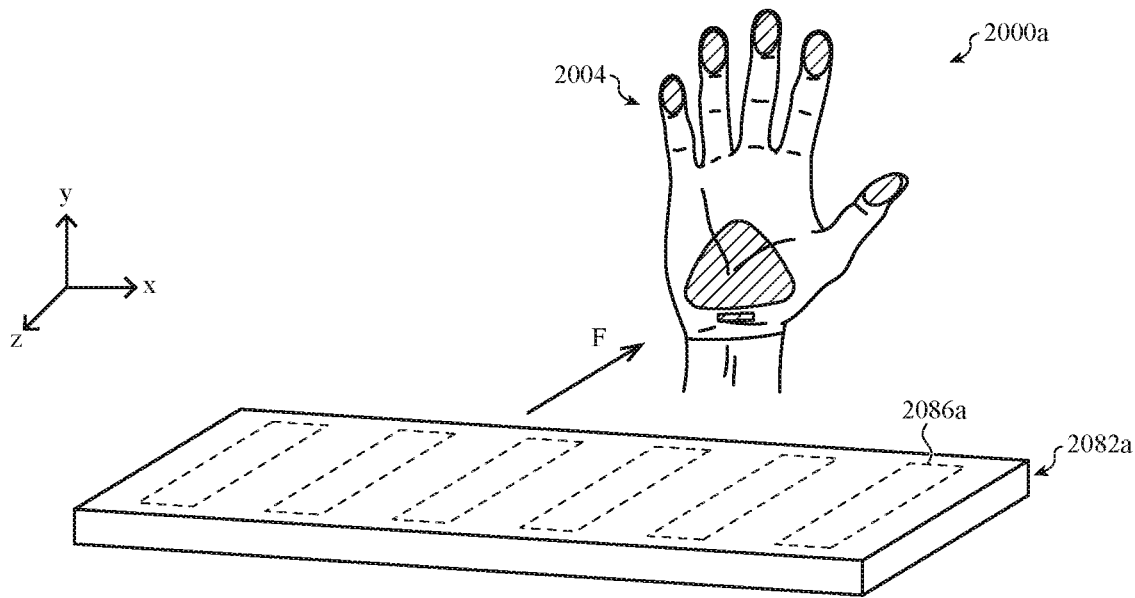
FIG. 20A depicts a user input device interacting with a magnetic field, according to one embodiment.
Figure 20B:
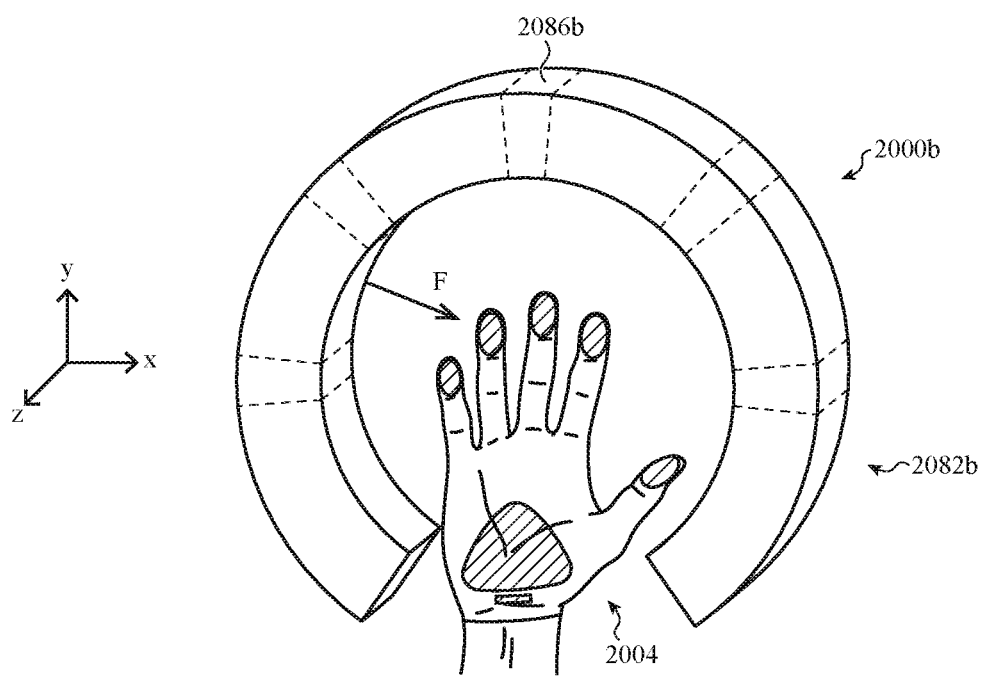
FIG. 20B depicts a user input device interacting with a magnetic field, according to another embodiment.

FIGS. 20A-20B depict an example computing system 2000 including user input device 2004 and external devices 2082a and 2082b. The user input device 2004 may be substantially analogous to the user input device 104 described with respect to FIG. 1. For example, the user input device 2004 may include, or be defined by, flexible fabrics configured for attachment to a user, which in some embodiments may be a glove. The user input device 2004 may be configured to detect an input configuration of the user input device 104 (or portions thereof) to control a computing or virtual reality device. For example, the user input device 2004 may identify an input configuration and generate a corresponding user input signal. Accordingly, the user input device 2004 may include similar software, firmware, and/or hardware components as that of the user input device 104, including a haptic feedback structure, primary sensing regions, secondary sensing regions, strain-sensitive elements, capacitive arrays, and so on.

The external devices 2082a, 2082b may be computing devices substantially analogous to the computing device 108 described with respect to FIG. 8. For example, the external devices 2082a, 2082b may be substantially any type of electronic device operable to receive user input. Accordingly, the user input device 2004 may be used to control an operation of the external devices 2082a, 2082b.

The external devices 2082a, 2082b may be configured to produce a magnetic field such that a force F is exerted on the user input device 2004. The external devices 2082a, 2082b may include an array of electromagnets or other biasing mechanisms. As depicted in FIG. 20A, the external device 2082a may include a planar array of magnets 2086a. The array of magnets 2086a may be positioned or arranged on (or within) the external device 2082a to produce a magnetic field. The magnetic field produced by the external device 2082a may cause a force to be exerted on the user input device 2004 in one or two of the x-direction, y-direction, or the z-direction (which may be orthogonal directions).

As depicted in FIG. 20B, the external device 2082b may include a circular array of magnets 2082b. The array of magnets 2082b may be electromagnets or other biasing mechanisms and may be positioned or arranged on (or within) the external device 2082 to produce a magnetic field. The magnetic field produced by the external device 2082b may cause a force to be exerted on the user input device 2004 one or more of (or all of) the x-direction, y-direction, or z-direction (which may be orthogonal directions).

The user input device 2004 may contain various magnetic components. As one example, as described with respect to FIG. 6D, the user input device may contain various conduits containing a ferrofluid. The ferrofluid may contain magnetically biased particles. The particles of the ferrofluid may be passive magnetic elements that do not require electric or other activation to produce a magnetic field. This may allow the particles of the ferrofluid to be attracted to (or repelled by) the magnetic fields produced by the external devices 2082a, 2082b. This may cause a user to experience force when the user input device is positioned adjacent the external devices 2082a, 2082b.

The electromagnets of the external devices 2082a, 2082b may be selectively activated to produce various haptics effects. For example, user input device 2004 may be manipulated into various input configurations adjacent to the external devices 2082a, 2082b. In response to a particular input configuration, the external devices 2082a, 2082b may activate one or more electromagnets. The activation of the electromagnets may produce a magnetic field that causes a predetermined amount of force to be exerted on the user input device 2004. In this regard, as one example, the activation of the electromagnets may be coordinated or synchronized to resemble a user interaction with a virtual environment. The activation of the magnetic field at the external devices 2082a, 2082b may allow the user input device 2004 to include passive magnetic elements, thereby reducing or eliminating the need for components of an electromagnet at, or within, the user input device 2004.

Figure 21:
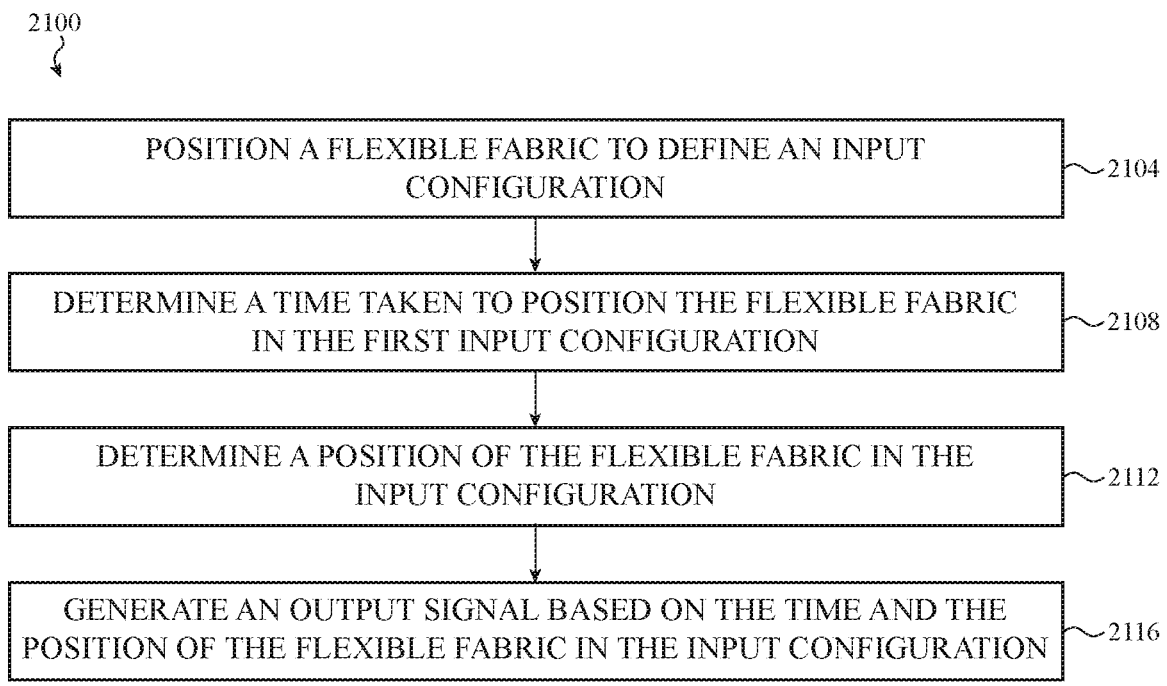
FIG. 21 illustrates a flow diagram of an embodiment of a method for operating a user input device.

To facilitate the reader's understanding of the various functionalities of the embodiments discussed herein, reference is now made to the flow diagram in FIG. 21, which illustrates process 2100. While specific steps (and orders of steps) of the methods presented herein have been illustrated and will be discussed, other methods (including more, fewer, or different steps than those illustrated) consistent with the teachings presented herein are also envisioned and encompassed with the present disclosure.

In this regard, with reference to FIG. 21, process 2100 relates generally to operating a user input device. The process 2100 may be used in conjunction with the user input device described herein (e.g., user input device 104 described with respect to FIG. 1). In particular, a controller or processing unit of the user input device may be configured to perform one or more of the example operations described below.

At operation 2104, a flexible fabric may be positioned to define an input configuration. For example and with reference to FIG. 8, the user input device 104 may be positioned in a first input configuration. The first input configuration may correspond to a predetermined function executable at the computing device 108 (e.g., such as controlling the motion of a cursor depicted at display 112). In some instances, the first input configuration may correspond to a neutral or "no-command" configuration.

At operation 2108, measurement circuitry connected operatively to the flexible fabric may determine a time taken to position the flexible fabric in the input configuration. For example and with reference to FIG. 8, the user input device 104 may contain a controller or other processing unit (e.g., such as controller 160) configured to identify an input configuration of the user input device 104. For example, the controller 160 may identify an input configuration based on the relative positions of secondary sensing regions 148a-148e. The controller 160 may also identify a time taken to identify, for example, an input configuration. In one embodiment, the time may be indicative of the time between the positioning of the user input device 104 into a first input configuration and the positioning of the user input device 104 into the second input configuration (e.g., which may depend on the rate at which a user moves the user input device 104 between the first and second input configurations).

At operation 2112, measurement circuitry connected operatively to the flexible fabric may determine a position of the flexible fabric in the input configuration. For example and with reference to FIG. 8, the user input device 104 may contain an array of sensors (e.g., such as those associated with primary sensing region 144, secondary sensing regions 148a-148e, or the like) to detect the position of the user input device 104, according to the embodiments described herein. In this regard, the array of sensors may be configured to detect the position of the user input device 104 in the input configuration.

At operation 2116, the user input device may be configured to generate an output signal based on the determined time (e.g., as determined at operation 2108) and the determined position of the flexible fabric in the input configuration (e.g., as determined at operation 2112). In one embodiment, the input configuration may correspond to a predetermined function executable by a separate computing device. In this regard, the output signal may be transmitted to a separate computing device, for example, to control an operation of the device. For example and with reference to FIGS. 1 and 8, the user input device 104 may transmit an output signal via communication module 152 to control an operation of computing device 108.

Figure 22:
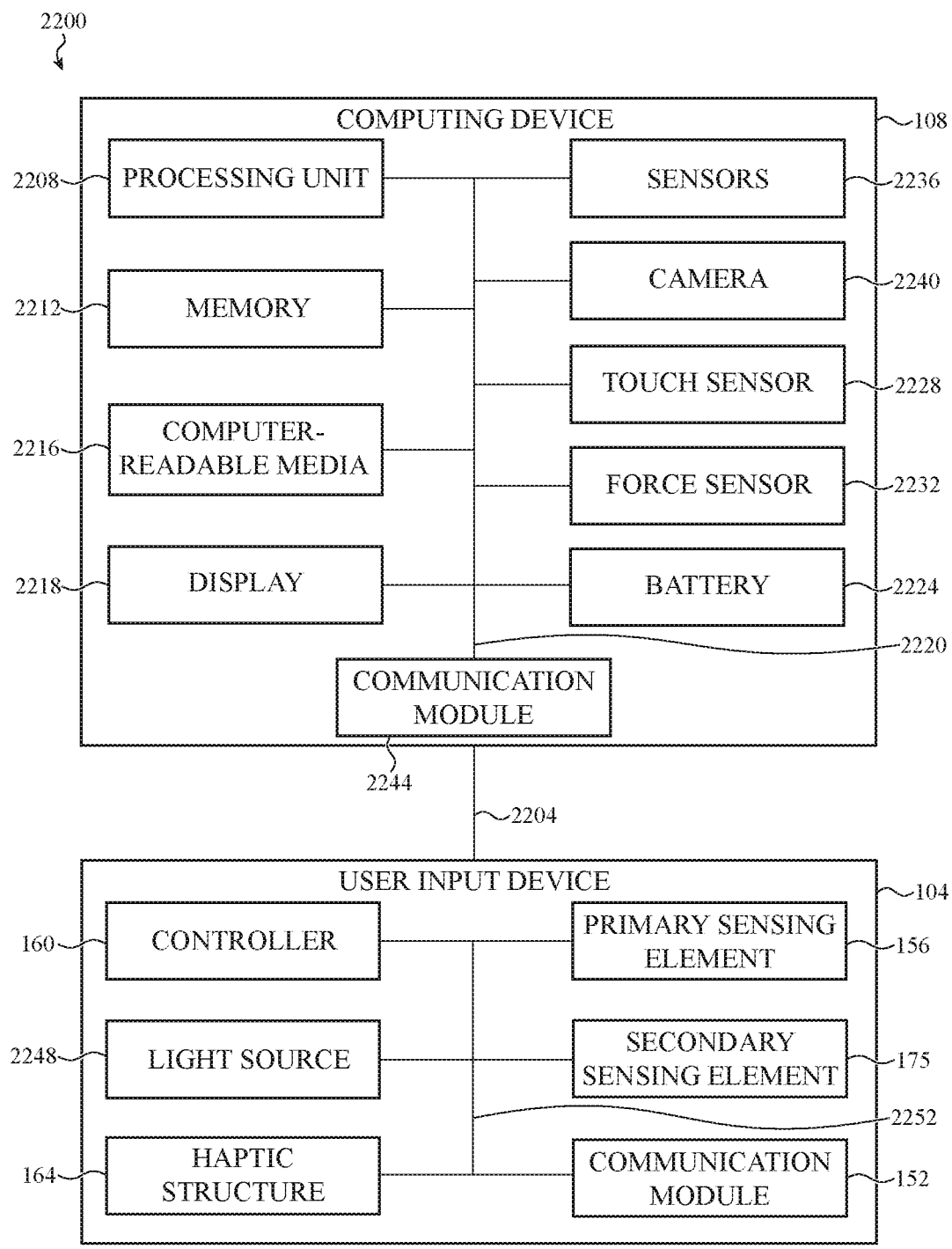
FIG. 22 depicts a functional block diagram of an embodiment of a system including a user input device and a separate interconnected computing device.

FIG. 22 presents a functional block diagram of an illustrative computing system 2200 in which computing device 108 is interconnected with user input device 104. The schematic representation in FIG. 22 may correspond to the computing device 108 depicted in FIG. 8, described above. However, FIG. 22 may also more generally represent other types of devices configured to receive a user input signal from a user input device in accordance with the embodiments described herein. In this regard, the computing system 2200 may include any appropriate hardware (e.g., computing devices, data centers, switches), software (e.g., applications, system programs, engines), network components (e.g., communication paths, interfaces, routers) and the like (not necessarily shown in the interest of clarity) for use in facilitating any appropriate operations disclosed herein.

Generally, the user input device 104 may be configured to identify an input configuration for use in controlling an operation of the computing device 108. In this regard, the computing device 108 and user input device 104 may be interconnected via operative link 2204. Operative link 2204 may be configured for electrical power and/or data transfer between the computing device 108 and the user input device 104. In this manner, user input device 104 may be used to facilitate operation of the computing device 108. For example, a user input signal generated by the user input device 104 may be transmitted to the computing device 108 via operative link 2204. Operative link 2204 may also be used to transfer one or more signals from the computing device 108 to the user input device 104 (e.g., a signal indicative of a particular haptic feedback for generation at the haptic feedback structure). In some cases, operative link 2204 may be a wireless connection; in other instances, operative link 2204 may be a hardwired connection.

As shown in FIG. 22, the computing device 108 may include a processing unit 2208 operatively connected to computer memory 2212 and computer-readable media 2216. The processing unit 2208 may be operatively connected to the memory 2212 and computer-readable media 2216 components via an electronic bus or bridge (e.g., such as system bus 2220). The processing unit 2208 may include one or more computer processors or microcontrollers that are configured to perform operations in response to computer-readable instructions. The processing unit 2208 may include the central processing unit (CPU) of the device. Additionally or alternatively, the processing unit 2208 may include other processors within the device including application specific integrated chips (ASIC) and other microcontroller devices.

The memory 2212 may include a variety of types of non-transitory computer-readable storage media, including, for example, read access memory (RAM), read-only memory (ROM), erasable programmable memory (e.g., EPROM and EEPROM), or flash memory. The memory 2212 is configured to store computer-readable instructions, sensor values, and other persistent software elements. Computer-readable media 2216 may also include a variety of types of non-transitory computer-readable storage media including, for example, a hard-drive storage device, a solid state storage device, a portable magnetic storage device, or other similar device. The computer-readable media 2216 may also be configured to store computer-readable instructions, sensor values, and other persistent software elements.

In this example, the processing unit 2208 is operable to read computer-readable instructions stored on the memory 2212 and/or computer-readable media 2216. The computer-readable instructions may adapt the processing unit 2208 to perform the operations or functions described above with respect to FIGS. 1-21. The computer-readable instructions may be provided as a computer-program product, software application, or the like.

As shown in FIG. 22, the computing device 108 may also include a display 2218. The display 2218 may include a liquid-crystal display (LCD), organic light emitting diode (OLED) display, light emitting diode (LED) display, or the like. If the display 2218 is an LCD, the display may also include a backlight component that can be controlled to provide variable levels of display brightness. If the display 2218 is an OLED or LED type display, the brightness of the display 2218 may be controlled by modifying the electrical signals that are provided to display elements.

The computing device 108 may also include a battery 2224 that is configured to provide electrical power to the components of the computing device 108. The battery 2224 may include one or more power storage cells that are linked together to provide an internal supply of electrical power. The battery 2224 may be operatively coupled to power management circuitry that is configured to provide appropriate voltage and power levels for individual components or groups of components within the computing device 108. The battery 2224, via power management circuitry, may be configured to receive power from an external source, such as an AC power outlet. The battery 2224 may store received power so that the computing device 108 may operate without connection to an external power source for an extended period of time, which may range from several hours to several days.

The computing device 108 may also include a touch sensor 2228 that is configured to determine a location of a touch over a touch-sensitive surface of the computing device 108. The touch sensor 2228 may include a capacitive array of electrodes or nodes that operates in accordance with a mutual-capacitance or self-capacitance scheme. The touch sensor 2228 may be integrated with one or more layers of a display stack (e.g., one or more cover sheets) to form a touch screen. The touch sensor 2228 may also be integrated with another component that forms an external surface of the computing device 108 to define a touch-sensitive surface.

The computing device 108 may also include a force sensor 2232 that is configured to receive force input over a touch-sensitive surface of the computing device 108. The force sensor 2232 may include one or more layers that are sensitive to strain or pressure applied to an external surface of the device. In particular, the force sensor 2232 may be integrated with one or more layers of a display stack to form a touch screen. In accordance with the embodiments described herein, the force sensor 2232 may be configured to operate using a dynamic or adjustable force threshold. The dynamic or adjustable force threshold may be implemented using the processing unit 2208 and/or circuitry associated with or dedicated to the operation of the force sensor 2232.

The computing device 108 may also include one or more sensors 2236 that may be used to detect an environmental condition, orientation, position, or some other aspect of the computing device 108. Example sensors 2236 that may be included in the computing device 108 may include, without limitation, one or more accelerometers, gyrometers, inclinometers, goniometers, or magnetometers. The sensors 2236 may also include one or more proximity sensors, such as a magnetic hall-effect sensor, inductive sensor, capacitive sensor, continuity sensor, or the like.

The sensors 2236 may also be broadly defined to include wireless positioning devices including, without limitation, global positioning system (GPS) circuitry, Wi-Fi circuitry, cellular communication circuitry, and the like. The computing device 108 may also include one or more optical sensors including, without limitation, photodetectors, photosensors, image sensors, infrared sensors, or the like. The sensors 2236 may also include one or more acoustic elements, such as a microphone used alone or in combination with a speaker element. The sensors 2236 may also include a temperature sensor, barometer, pressure sensor, altimeter, moisture sensor, or other similar environmental sensor.

The sensors 2236, either alone or in combination, may generally be configured to determine an orientation, position, and/or movement of the computing device 108. The sensors 2236 may also be configured to determine one or more environmental conditions, such as temperature, air pressure, humidity, and so on. The sensors 2236, either alone or in combination with other input, may be configured to estimate a property of a supporting surface including, without limitation, a material property, surface property, friction property, or the like.

The computing device 108 may also include a camera 2240 that is configured to capture a digital image or other optical data. The camera 2240 may include a charge-coupled device, complementary metal oxide (CMOS) device, or other device configured to convert light into electrical signals. The camera 2240 may also include one or more light sources, such as a strobe, flash, or other light-emitting device. As discussed above, the camera 2240 may be generally categorized as a sensor for detecting optical conditions and/or objects in the proximity of the computing device 108. However, the camera 2240 may also be used to create photorealistic images that may be stored in an electronic format, such as JPG, GIF, TIFF, PNG, raw image file, or other similar file types.

The computing device 108 may also include a communication module 2244 that is configured to transmit and/or receive signals or electrical communication from an external or separate device. The communication module 2244 may be configured to couple to an external device via a cable, adaptor, or other type of electrical connector, for example, via operative link 2204. In some embodiments, the communication module 2244 may be used to couple the computing device 108 to user input device 104 and/or other appropriate accessories configured to send and/or receive electrical signals. The communication module 2244 may be configured to receive identifying information from an external accessory, which may be used to determine a mounting or support configuration. For example, the communication module 2244 may be used to determine that the computing device 108 is coupled to a mounting accessory, such as a particular type of stand or support structure.

As described above in relation to FIGS. 1-21, the user input device 104 may generally employ various components to facilitate identifying an input configuration and generating haptic feedback for use in controlling the computing device 108. As shown, and with reference to FIGS. 1-3, the user input device 104 may include: primary sensing element 156; haptic feedback structure 164; secondary sensing elements 175; controller 160; light source 2248; and communication module 152; all of which may be interconnected by one or more system busses 2252.

As described above, the user input device 104 may be configured to identify an input configuration of the user input device 104. In this manner, the user input device 104 may include the primary sensing element 156 and the secondary sensing element 175. The primary sensing element 156 may be configured to detect global movements of the user input device 104. The secondary sensing element 175 may be configured to detect a position of the user input device 104. In one embodiment, the controller 160 may identify an input configuration based on the detected position of the user input device 104. The haptic feedback structure 164 may generate haptic feedback based on the identified input configuration. In some embodiments, a light source 2248 may be configured to illuminate a boundary of an array of user regions that may be defined in relation to the user input device 104. In this manner, movement of the user input device 104, or portions thereof, relative to the illuminated user input regions may cause the generation of a user input signal for use in controlling an operation of the computing device 108. Communication module 152 may be configured to send and receive electronic signals with communication module 2244 such that the user input device 104 and computing device 108 can maintain bi-directional communication via operative link 2204.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A user input device, comprising:
   a first attachment piece that attaches to a first fingertip of a user without covering at least a portion of the first fingertip;
   a first motion sensor in the first attachment piece that gathers first motion sensor data;
   a force sensor in the first attachment piece that gathers force input at the first fingertip;
   a second attachment piece that attaches to a second fingertip of the user without covering at least a portion of the second fingertip;
   a second motion sensor in the second attachment piece that gathers second motion sensor data; and
   control circuitry that:
      determines a position of the first attachment piece relative to the second attachment piece based on the first motion sensor data and the second motion sensor data;
      determines whether the user input device is in a keyboard input configuration or a trackpad input configuration based on the position of the first attachment piece relative to the second attachment piece; and
      processes the force input as keyboard input when the user input device is in the keyboard input configuration and as trackpad input when the user input device is in the trackpad input configuration.

2. The user input device defined in claim 1 wherein the control circuitry determines whether the user input device is in a mouse input configuration or a video game controller input configuration based on the position of the first attachment piece relative to the second attachment piece and processes the force input as mouse input when the user input device is in the mouse input configuration and as video game controller input when the user input device is in the video game controller input configuration.

3. The user input device defined in claim 2 further comprising a first haptic output device in the first attachment piece and a second haptic output device in the second attachment piece.

4. The user input device defined in claim 3 wherein the control circuitry provides haptic output using the first and second haptic output devices based on whether the user input device is in the keyboard input configuration, the trackpad input configuration, the mouse input configuration, or the video game controller input configuration.

5. The user input device defined in claim 1 wherein the first attachment piece is separate from the second attachment piece.

6. The user input device defined in claim 1 further comprising a communication module that transmits a user input signal to an external computing device based on the position of the first attachment piece relative to the second attachment piece.

7. The user input device defined in claim 1 further comprising an additional force sensor in the second attachment piece that gathers additional force input at the second fingertip.

8. The user input device defined in claim 7 further comprising a first haptic output device in the first attachment piece and a second haptic output device in the second attachment piece.

9. The user input device defined in claim 8 wherein the control circuitry provides first haptic output using the first haptic output device based on the force input and provides second haptic output using the second haptic output device based on the additional force input and wherein the first haptic output is different from the second haptic output.

10. The user input device defined in claim 9 wherein the force sensor and the additional force sensor comprise strain gauges.

11. A user input device, comprising:
   an attachment piece that attaches to a fingertip of a user and that leaves at least part of the fingertip uncovered;
   a force sensor in the attachment piece that gathers force data as the fingertip presses against an external surface;
   a motion sensor in the attachment piece that gathers motion data as the fingertip moves;
   a haptic output device in the attachment piece that provides haptic output to the fingertip; and
   control circuitry that adjusts the haptic output based on the force data and the motion data.

12. The user input device defined in claim 11 wherein the force sensor comprises a strain gauge and the motion sensor comprises an accelerometer.

13. The user input device defined in claim 11 further comprising a communication module that transmits user input signals to an external computing device based on the force data and the motion data.

14. The user input device defined in claim 13 wherein the external computing device comprises a virtual reality device that presents a virtual environment and wherein the control circuitry determines a position of the fingertip within the virtual environment based on the motion data.

15. The user input device defined in claim 14 wherein the control circuitry adjusts the haptic output based on the position of the fingertip within the virtual environment.

16. A user input device, comprising:
attachment pieces that respectively attach to individual fingertips of a user;
motion sensors in the attachment pieces that measure positions of the attachment pieces relative to each other;
force sensors in the attachment pieces that gather force input at the individual fingertips;
haptic output devices that provide haptic output to the individual fingertips; and
control circuitry that adjusts the haptic output to the individual fingertips based on the positions of the attachment pieces relative to each other and based on the force input.

17. The user input device defined in claim 16 wherein the control circuitry determines an input configuration for the user input device based on the positions of the attachment pieces relative to each other and wherein the input configuration is selected from the group consisting of: a mouse input configuration, a keyboard input configuration, a trackpad input configuration, and a video game controller input configuration.

18. The user input device defined in claim 17 wherein the control circuitry adjusts the haptic output to the individual fingertips based on the input configuration.

19. The user input device defined in claim 16 further comprising a communications module that transmits a user input signal to a virtual reality computing device based on the positions of the attachment pieces relative to each other.

20. The user input device defined in claim 16 wherein the haptic output provided to a first of the individual fingertips is different from the haptic output provided to a second of the individual fingertips.

* * * * *